United States Patent
McNew et al.

(10) Patent No.: US 10,377,303 B2
(45) Date of Patent: Aug. 13, 2019

(54) MANAGEMENT OF DRIVER AND VEHICLE MODES FOR SEMI-AUTONOMOUS DRIVING SYSTEMS

(71) Applicant: Toyota Motor Engineering & Manufacturing North America, Inc., Erlanger, KY (US)

(72) Inventors: John Michael McNew, Ann Arbor, MI (US); Vladimeros Vladimerou, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 23 days.

(21) Appl. No.: 14/477,445

(22) Filed: Sep. 4, 2014

(65) Prior Publication Data
US 2016/0068103 A1   Mar. 10, 2016

(51) Int. Cl.
*B60Q 9/00* (2006.01)
*B60W 50/14* (2012.01)
*B60W 30/16* (2012.01)
*B60W 30/12* (2006.01)

(52) U.S. Cl.
CPC ............... *B60Q 9/00* (2013.01); *B60W 30/12* (2013.01); *B60W 30/16* (2013.01); *B60W 50/14* (2013.01)

(58) Field of Classification Search
CPC .................................................. G08B 21/02
See application file for complete search history.

(56) References Cited

U.S. PATENT DOCUMENTS

| | | | |
|---|---|---|---|
| 7,479,892 B2 | 1/2009 | Ling et al. | |
| 8,103,398 B2 | 1/2012 | Duggan et al. | |
| 8,428,843 B2 | 4/2013 | Lee et al. | |
| 8,577,550 B2 | 11/2013 | Lu et al. | |
| 8,655,537 B2 | 2/2014 | Ferguson et al. | |
| 8,670,903 B2 | 3/2014 | Lee et al. | |
| 8,823,530 B2* | 9/2014 | Green | B60K 28/06 340/576 |
| 2008/0055114 A1* | 3/2008 | Kim | B60R 1/00 340/937 |
| 2008/0091318 A1 | 4/2008 | Deng et al. | |
| 2010/0082195 A1* | 4/2010 | Lee | B62D 15/025 701/25 |
| 2011/0284304 A1* | 11/2011 | Van Schoiack | B60W 40/08 180/272 |
| 2012/0206252 A1 | 8/2012 | Sherony et al. | |
| 2012/0283913 A1 | 11/2012 | Lee et al. | |
| 2013/0131906 A1 | 5/2013 | Green et al. | |
| 2013/0253767 A1 | 9/2013 | Lee et al. | |
| 2014/0195120 A1* | 7/2014 | McClain | G08G 1/16 701/41 |
| 2015/0314783 A1* | 11/2015 | Nespolo | B60W 30/0953 701/301 |

* cited by examiner

*Primary Examiner* — Jelani A Smith
*Assistant Examiner* — Kelly D Williams
(74) *Attorney, Agent, or Firm* — Oblon, McClelland, Maier & Neustadt, L.L.P.

(57) ABSTRACT

A least restrictive allowable driving state of a semi-autonomous driving system is determined based on one or more threats and sensor performance. A current driving state and a future driving state are determined based on an attention state and a steering state of a driver. Warnings are provided to the driver in order to match the current driving state to the future driving state. Driver interaction and attention are enforced when the driver does not respond to the warnings.

20 Claims, 15 Drawing Sheets

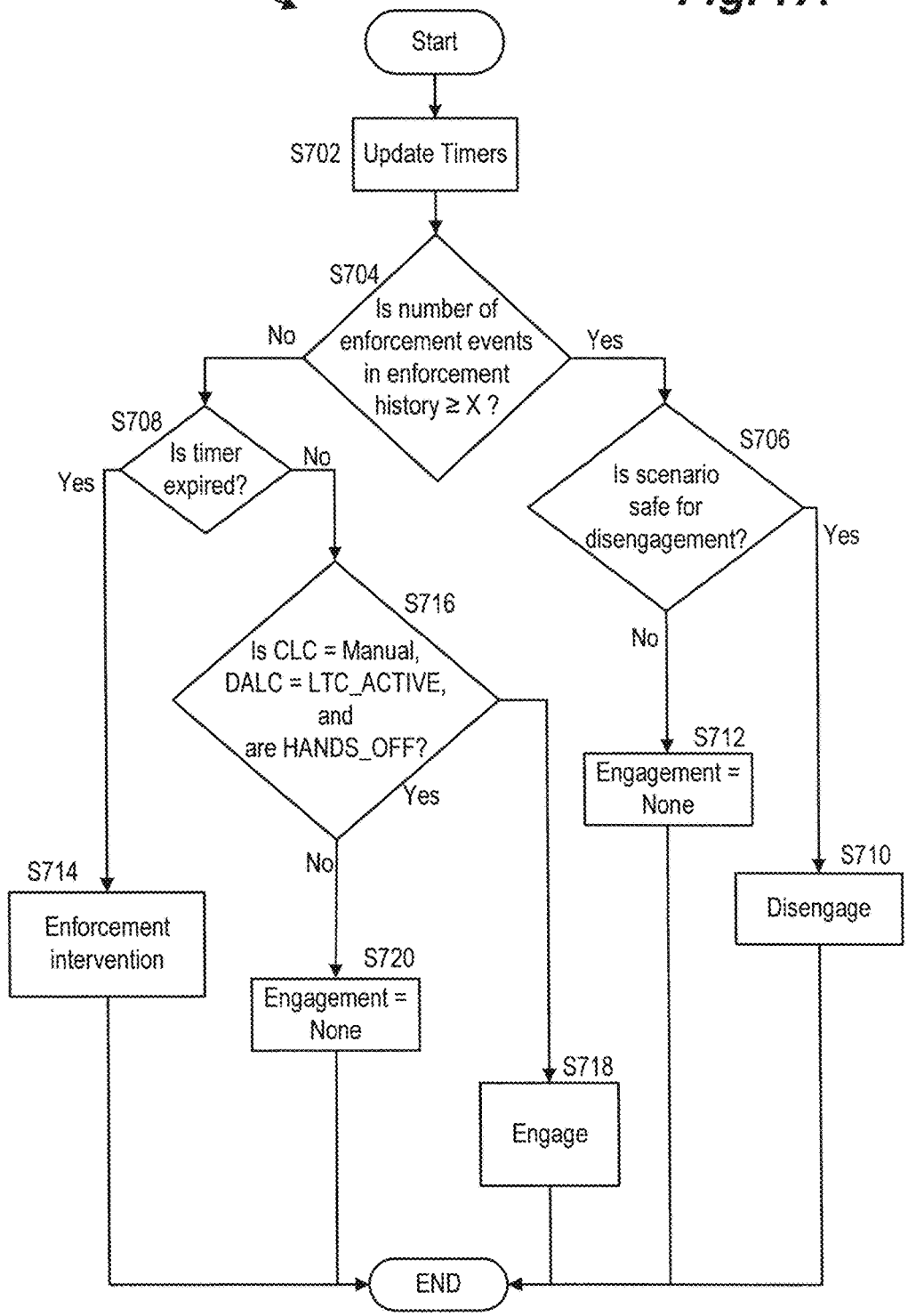

MANAGEMENT OF DRIVER AND VEHICLE MODES FOR SEMI-AUTONOMOUS DRIVING SYSTEMS

BACKGROUND

A semi-autonomous driving system can manage lane centering and automatic cruise control based on current and future driving states. U.S. Patent Application Publication No. 2013/0253767 A1 entitled "System and Method for Vehicle Lateral Control" to Lee et al. describes a method for lane correction and torque-assisted steering based on a planned path to reduce driver input.

SUMMARY

The present disclosure is directed to managing vehicle control states of a semi-autonomous vehicle while simultaneously managing a driving state of a driver, which can include driver steering interaction as well as driver attention to the road. In an exemplary implementation, a least restrictive allowable driving state of a semi-autonomous driving system is determined based on one or more threats and sensor performance. A current driving state and a future driving state are determined based on an attention state and a steering state of a driver. Warnings are provided to the driver in order to match the current driving state to the future allowable driving state. Furthermore, driver interaction and attention are enforced when the driver does not respond to the warnings.

The threats can be determined to be a safety threat or a comfort threat and can be driver-sensed or system-sensed. Each of the threats can have a desired action by the driver. The priority of the threats can be determined based on an associated time of occurrence of the threats. A driver response time to the threats can be based on a driver attention time, an eyes on the road time, and a hands-on-the-wheel time. The least restrictive allowable driving state can be based on a comparison of the time of occurrence of the threats to the driver response time.

The future driving state can be set to the least restrictive allowable driving state if it is determined that the driver has complied with one or more previous requests by the semi-autonomous driving system and if the future driving state will not generate one or more warnings within a predetermined time period.

The warnings can include attention warnings and steering warnings and can be provided when the future driving state is more restrictive than at least one of the current driving state and a current lane trace control state. The current lane trace control state can be determined based on a level of automation of a lane trace control system.

An amount of time the driver takes to comply with the warnings can be determined, and driving interaction can be enforced when the amount of time the driver takes to comply with the warnings is greater than a first predetermined threshold. The driving interaction can be enforced by reducing a speed of an automatic cruise control system.

The number of enforcement events in an enforcement history can be compared to a second predetermined threshold, and a safe scenario for disengaging the semi-autonomous driving system can be determined. The semi-autonomous driving system can be disengaged when the number of the enforcement events in the enforcement history is greater than the second predetermined threshold.

A process can include: determining a least restrictive allowable driving state of a semi-autonomous driving system based on one or more threats and sensor performance; determining a current driving state and a future driving state based on an attention state and a steering state of a driver; providing warnings to the driver to match the current driving state to the future driving state; and enforcing driving interaction or attention when the driver is not responding to the warnings.

A non-transitory computer-readable storage medium including executable instructions, which when executed by circuitry, can cause circuitry to perform the process.

A system can include: one or more sensors to obtain threat data and driver monitoring data; and a controller including a processor. The processor can: determine a least restrictive allowable driving state of a semi-autonomous driving system based on one or more threats and sensor performance; determine a current driving state and a future driving state based on an attention state and a steering state of a driver; provide warnings to the driver to match the current driving state to the future driving states; and enforce driving interaction or attention when the driver is not responding to the warnings.

The system can be a part of vehicle system or a vehicle sub-system, and can be removable from the vehicle as a detachable module.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A illustrates a flowchart of an enforcement and engagement calculation;

DETAILED DESCRIPTION

Figure 1:
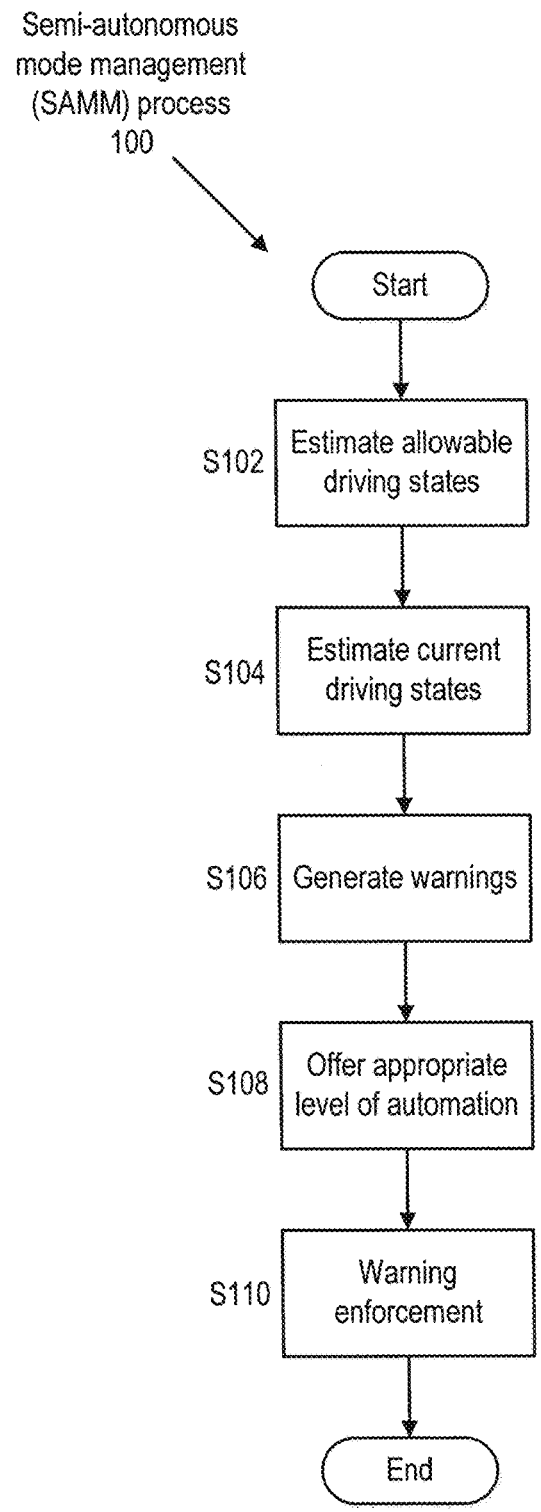
FIG. 1 is an exemplary illustration of a semi-autonomous mode management process.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "proximate," and similar terms generally refer to ranges that include the identified value within a margin of 20%, 10%, or preferably 5%, and any values therebetween.

In semi-autonomous driving systems, steering control, speed control, and sensing systems can be controlled by processing circuitry within a vehicle. In some aspects, activation of the semi-autonomous driving systems can be limited to one or more operating regions, such as when driving on highways or in low traffic areas. In some implementations, a semi-autonomous mode manager (SAMM) can interface between vehicle control systems and a human machine interface (HMI) to manage allowable driving states based on current and future driving scenarios as well as an attention state of a driver. The SAMM can manage when lane trace control (LTC) and/or automatic cruise control (ACC) is offered to the driver, generate warnings and/or requests to prompt the driver to interact with the steering wheel and/or pay attention to the road, and enforce driver attention or steering interaction when the driver is not responding to the warnings. The attention state of the driver can be based on the driver having eyes on the road as determined by head and gaze angle and eye closure measurements, interacting with a steering wheel, brake pedal, or gas pedal, or explicitly setting the cruise control.

FIG. 1 is an exemplary illustration of a semi-autonomous mode management process 100. At step S102, an estimation of a least restrictive allowable driving state is made by the processing circuitry of the SAMM. The SAMM can receive input from sensors such as radar, lidar (light detection and ranging), vehicle-mounted cameras, GPS, stored maps, and the like in order to determine current and upcoming threats. The sensor data that is used to determine the threats can be referred to as threat data according to an implementation. The threats can include any type of scenarios through which a consequence could occur, such as lane splits or merges, lane marker degradation, and the like. In some implementations, the threats have associated criteria for identifying the threats that are stored in a database and are accessed by the processing circuitry. For example, in the case of a lane split, the processing circuitry can retrieve lane split information from map information stored in the database. In addition, the vehicle-mounted camera can obtain images of the road that indicate that the vehicle is approaching a lane split. Each threat can also have an associated consequence level (e.g., safety or comfort) and a desired driver state (e.g., driver must steer, driver must have hands on steering wheel, or driver must look at road). Each threat can also have a time to consequence (TC), which is the amount of time the driver has to achieve the desired state in order to avoid the consequence. The TC can be based on location of the threat, speed of the vehicle, and the like.

The least restrictive allowable driving state can also be affected by sensor performance. For example, if the quality of images obtained from the vehicle-mounted camera is degraded due to weather conditions, confidence in the accuracy of the LTC system may be decreased, and the allowable driving state may be set to a level that requires a greater amount of driver intervention. Examples of allowable driving states can include LTC_ACTIVE, CO-STEER, MANUAL, or OFF. In some implementations, LTC_ACTIVE means that the LTC system is centering the vehicle in a lane without driver input. The CO-STEER driving state can mean that the LTC system is active but operating at a reduced capability, and the driver can be required to place hands on the steering wheel to provide additional steering torque and/or supervision. The MANUAL driving state can indicate that the driver is actively steering the vehicle and the LTC system on and sensing but not providing steering output. The OFF driving state can indicate that the driver is actively steering the vehicle and the LTC system is turned off.

At step S104, an estimation of a current driving state is made. In an implementation, current driver steering control states (CSS) can include steering states such as DRIVER_IS_STEERING, HANDS_ON, and HANDS_FREE. DRIVER_IS_STEERING can mean that the driver is actively steering the vehicle. In some aspects, HANDS_ON can mean that the driver's hands are resting on the steering wheel but are not actively steering the vehicle. HANDS_FREE can mean that the driver's hands are resting somewhere other than the steering wheel. A steering wheel grip sensor can detect whether the driver's hands are in contact with the steering wheel and can include one or more tactile, pressure, or capacitive sensors. A database can store positions of proper or acceptable hand placements on the steering wheel or patterns in time or space of hand pressures, and detected positions or contact pressures can be compared with the stored positions and/or time and space patterns to determine whether the driver's hands are properly grasping the steering wheel. An optical sensor, such as a camera, can also detect hand position, either collaboratively with the grip sensor or alone. In some aspects, a steering wheel torque sensor can detect whether the driver is actively steering the vehicle by measuring the speed, direction, and/or force of rotation of the steering wheel.

Another aspect of the current driving state can include an attention state of the driver such as whether or not the driver has eyes on the road. In some implementations, the determination of whether or not the driver has eyes on the road is made based on processing driver monitoring data from a driver monitoring camera. The driver monitoring camera can detect information related to the driver's current viewing angle (i.e., indicia of the viewing angle of the driver). In an implementation, the driver monitoring camera can be an in-vehicle device such as a video camera, charge coupled device (CCD) camera, or complementary metal-oxide-semiconductor (CMOS) camera that captures images of the driver. Other cameras, such as infrared cameras, can also be used. The cameras can also be utilized with or replaced by time-of-flight sensors, such as a lidar device, that recognize objects or features. The driver images can be processed to obtain information related to the driver's viewing angle.

In addition, estimations regarding a driver response time are also made. In some implementations, Driver Attention Time (DAT), is an estimate of the time that may elapse before the driver looks at (and sees) the road again without being warned to do so. Driver Eyes on Road to Warning Time (EORW) is an estimate of the time that may elapse before the driver looks at (and sees) the road again after receiving a warning. Driver Hands-on-the-Wheel Time (HOWT) is an estimate of the time that may elapse before the driver moves his or her hands to the steering wheel. The DAT, EORW, and HOWT can be constant values that are determined from pre-existing data measured from a population of drivers. For example, if the average DAT for a population of 1000 drivers is approximately 1.5 seconds, the DAT can be set to 1.5 seconds.

The DAT, EORW, and HOWT can also be determined based on observations of the driver over time. For example, the DAT, EORW, and HOWT can be set to initial values that can be modified based on observing the driver's reaction time over time since different drivers can have reaction times that are widely varied. For example, machine learning techniques, such as artificial neural networks, clustering, or the like, can be implemented to determine the most accurate DAT, EORW, and HOWT for a driver.

At step S106, warnings or requests are generated to correct the current driving state if the allowable driving states are more restrictive than the current driving states. For example, there may be an upcoming threat of a curve in the road that is too sharp for the LTC system to navigate and has a desired driving state of DRIVER_MUST_STEER. If the driver currently has hands off the steering wheel, the SAMM can issue a warning to the driver via a human-machine interface (HMI) to place his or her hands back on the steering wheel. In addition, if the TC for a threat is less than the DAT, the SAMM can issue a warning to the driver via the HMI to look straight ahead with eyes on the road.

The HMI can include one or more visual warning devices within the vehicle, such as a heads up display or an instrument cluster. In some implementations, the HMI visual warning devices can be visible to the driver when the driver has eyes on the road (i.e., the one or more visual displays are within the driver's view when the driver is looking straight-ahead along the forward trajectory of the vehicle). The HMI visual warning devices can also be outside the straight-ahead view of the driver but within the driver's peripheral vision, such as a navigational screen, instrument cluster, rear-view or side-view mirrors displays, and the like.

The HMI can also issue auditory warnings that can be transmitted by a standard vehicle audio system, an audio loudspeaker, a piezoelectric transducer, magnetostrictive transducer, electrostatic transducer, or other sound transducer. The auditory warnings can be output as spoken words, chimes, alarms, music, or other sound configured to communicate information or stimulate driver emotion or response. In some implementations, the HMI can also issue warnings via haptic devices that can stimulate the driver's tactile sense. The haptic warning devices can include a mechanical transducer connected to a seat, a brake pedal, a seat belt, a steering wheel, or other part of the vehicle that is in physical contact with the driver. The haptic warning devices can also include air blown from a ventilation system in the vehicle and other forms of tactile communication configured to alert or otherwise communicate information or stimulate an emotion to the driver.

At step S108, the SAMM offers a level of automation to the driver that is higher than the current level of automation if the allowable driving state is less restrictive than the current driving state and predetermined criteria are met. In order for the higher level of automation to be offered to the driver, the driver can be required to comply with previous requests from the SAMM, according to some implementations. In one example, a current vehicle control state is MANUAL, and the next allowable vehicle control state is LTC_ACTIVE. If the previous warning to the driver was "DRIVER_MUST_STEER," and the current driver steering control state is "HANDS_FREE," the driver will not be offered a higher level of automation until the driver places hands on the steering wheel and demonstrates steering control of the vehicle. The HMI can issue a LTC_BLOCKED_BY_STEERING warning to the driver to prompt the driver to demonstrate positive steering control before implementing a higher level of automation.

At step S110, the SAMM implements enforcement actions, if necessary, in order to force the driver to comply with previously issued warnings. When a warning is issued by the HMI, a timer can be set. When the driver acknowledges the warning by taking the proper action (e.g., placing eyes on the road or steering), the warning stops and the timer is reset. In some implementations, when the timer reaches a threshold before being acknowledged by the driver the processing circuitry of the SAMM can send control signals to enforce the desired driving state by altering among other things the vehicle control. According to some aspects, speed enforcement can include lowering the ACC speed to a level that may be uncomfortable to the driver or pumping the brakes or by inducing uncomfortable lateral motion in order to encourage the driver to acknowledge the warning. In some implementations, enforcement actions can include other types of actions that can induce driver compliance with the warnings such as using an audio signal that may cause discomfort to a driver who is ignoring the warnings from the SAMM.

In addition, a determination can be made that the driver may be purposely ignoring the semi-automatic driving system if the driver does not comply with the issued warnings in a predetermined number of seconds. In some implementations, the warnings may have been issued repeatedly without response by the driver. If the driver has not complied with the predetermined number of warnings within a predetermined window of time, the SAMM can issue control signals to shut off the semi-automatic driving system in a controlled manner, which can be referred to as disengaging the system. In an implementation, the window of time can be a predetermined period of time that a driver that has not complied with warnings that may indicate that the driver is purposely ignoring the semi-autonomous driving system.

In an example where the driver has been offered a higher level of automation, the SAMM can issue a control signal to engage the semi-automatic driving system if the driver properly acknowledges the offer. For example, if the SAMM has offered LTC to the driver, a control signal can be sent to engage the LTC system after the driver has lifted his or her hands from the steering wheel to acknowledge the offer. In other implementations acknowledgement of the offer of a transition to LTC can occur via tactile interaction with buttons or stalks, voice command, etc.

Details regarding the semi-autonomous mode management process 100 are discussed further herein. The present disclosure is focused toward describing a semi-autonomous mode management system of a vehicle with respect to managing a steering state of a semi-autonomous driving system in order to provide a more concise description. Extending the scope of the semi-autonomous mode management system to include managing speed control states and other types of driving states can be seen as straightforward to one of ordinary skill in the art.

Figure 2:
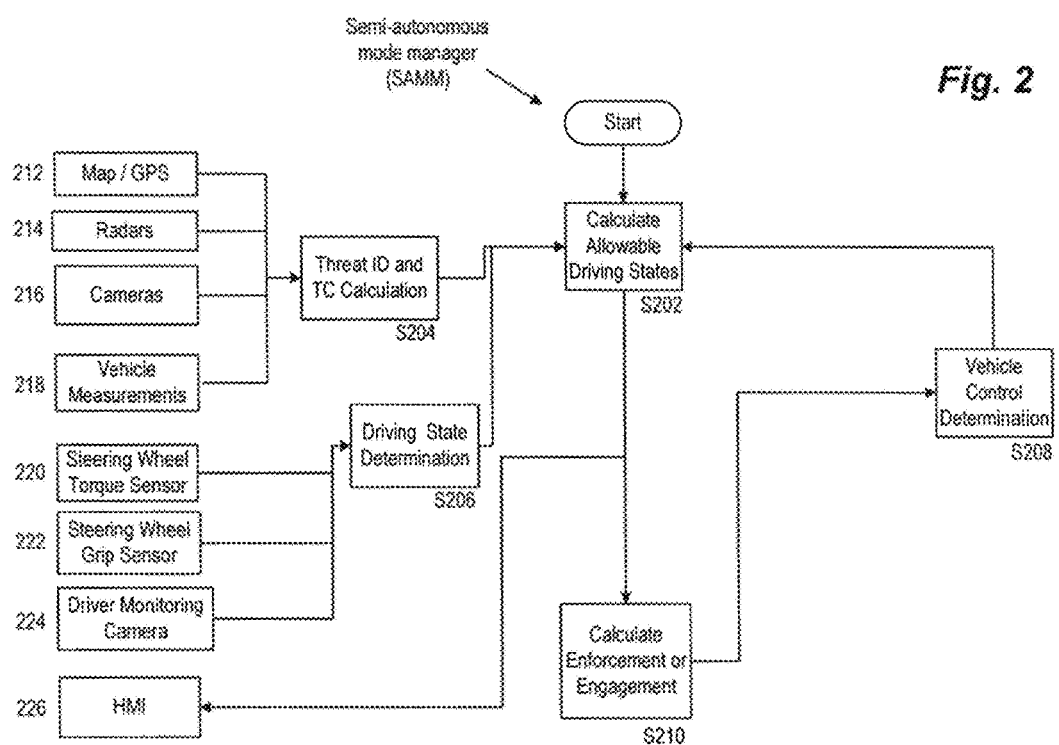
FIG. 2 is an exemplary illustration of a semi-autonomous mode manager (SAMM)

FIG. 2 is an exemplary illustration of a configuration of a SAMM, according to an implementation. A calculation of an allowable driving state at step S202 is made based on inputs received from a threat identification (ID) and TC calculation step S204, driving state determination step S206, and a vehicle control determination step S208. The processing circuitry can determine the current lane centering control (CLC) state and a driver available LTC control (DALC). In certain aspects, the CLC can indicate the current state of the LTC system, such as LTC_ACTIVE, CO-STEER, MANUAL, or OFF. The DALC can be the driving state that the driver can transition to in the next time step based on the least restrictive allowable driving state and the driver's response to previous warnings.

In addition to determining the allowable driving state at step S202, the processing circuitry can send control signals to a HMI 226 to display requests or warnings to the driver based on current and future driving states. The allowable driving states are also utilized in the calculation of enforcement or engagement step S210 in order to determine if the driver has complied with warnings within a predetermined amount of time. Details regarding the calculation of the allowable driving state at step S202 are discussed further with respect to FIG. 3.

At step S204, threat identification and TC calculation is performed and provided as an input to the calculation of the allowable driving state at step S202. Data from maps/GPS 212, radars 214, cameras 216, vehicle measurements 218, and the like can be used to determine the location of threats and the amount of time until the vehicle encounters the threats (TC). For example, for the threat of a lane split or lane merge, the processing circuitry can correlate a GPS position to a position on a stored map and determine the vehicle's distance to the lane split or lane merge and an approximate time of encountering the threat. The radars 214 can include one or more millimeter wave radars and/or lidar to determine distances to threats such as other vehicles, pedestrians, or other road obstacles.

One or more cameras 216 may be mounted on the vehicle so as to obtain images of the surface of the road in front of the vehicle to identify objects such as lane markers. According to some implementations, more than one camera may be mounted on the vehicle to obtain images of the surface of the road on which the vehicle is traveling. Depending on a user's desired configuration, a camera may also be mounted on the vehicle so that it is positioned to obtain images of the surface of the road behind the vehicle. The cameras 216 can also be configured to obtain images of other vehicles or objects ahead of or behind the vehicle. In some implementations, the vehicle measurements 218 can be used to provide a more accurate determination of the distance to a threat and the TC based on the speed of the vehicle, the relative locations of the sensors on the vehicle and the dimensions of the vehicle.

In some implementations, the threats can have associated criteria for identifying the threat which are stored in a database and are accessed by the processing circuitry. For example, the vehicle-mounted camera can obtain images of the road that indicate that the vehicle is approaching a lane split. Each threat can also have an associated consequence level (e.g., safety or comfort) and a desired driver state (e.g., driver must steer, driver must have hands on steering wheel, or driver must look at road). Each threat can also have a time to consequence (TC), which is the amount of time the driver has to achieve the desired state in order to avoid the consequence. The TC can be based on location of the threat, speed of the vehicle, and the like.

The driving state determination of step S206 determines a current state of the driver. In an implementation, the current state of the driver can include how the driver is interacting with the steering wheel and/or steering system (CSS) and an attention state of the driver, which can be indicated by whether the not the driver has eyes on the road. The CSS can include DRIVER_IS_STEERING, HANDS_ON, and HANDS_FREE. In some implementations, a steering wheel grip sensor 222 can detect whether the driver's hands are in contact with the steering wheel and can include one or more tactile, pressure, or capacitive sensors. A steering wheel torque sensor 220 can detect if the driver is actively steering the vehicle based on measuring the speed, direction, and/or force of rotation of the steering wheel. In some implementations, the determination of whether or not the driver has eyes on the road is made based on processing data from a driver monitoring camera 224. The driver monitoring camera 224 can detect information related to the driver's current viewing angle as well as a distance between the top and bottom eyelid of the driver.

At step S210, the SAMM can determine enforcement or engagement actions based on current driving states, future driving states, and whether or not the driver has complied with previous warnings or requests from the SAMM. Enforcement actions can be employed to prompt the driver to comply with previously issued warnings. In an implementation, if the timer that is set when a warning is issued reaches a predetermined threshold, the SAMM can send speed enforcement control signals to lower the ACC speed to a level that may be uncomfortable to the driver or pump the breaks in order to encourage the driver to acknowledge the warning. If warnings have been issued repeatedly and the driver has not responded to the warnings after a predetermined period of time, the control circuitry can send a signal to actuators of the LTC system to disengage by shutting off the semi-automatic driving system in a controlled manner. In addition, the SAMM can issue a control signal to engage the semi-automatic driving system if the driver properly acknowledges the offer. For example, if the SAMM has offered LTC_ACTIVE to the driver, a control signal can be sent to engage the LTC system after the driver has lifted his or her hands from the steering wheel to acknowledge the offer.

At step S208, an available and a current vehicle control state are determined. The vehicle control state can be determined based on the enforcement and engagement actions from step S210 and the allowable driving state that was calculated at step S202. In some implementations, vehicle available LTC control (VALC) is the steering control state that can be offered by the vehicle in the next time step based on sensor performance and driver allowable LTC control (DALC) is the vehicle control state that will actually be offered to the driver. For example, the DALC may be LTC_ACTIVE if VALC is LTC_ACTIVE and if the TC for current and future threats is greater than the DAT, EORW, and/or HOWT. On the other hand, the DALC may be MANUAL even if VALC is LTC_ACTIVE if the TC for current and future threats is less than or equal to than the DAT, EORW, and/or HOWT. However, if the driver has repeatedly ignored previous warnings and enforcement actions and the predetermined period of time has elapsed, the semi-automatic driving system may be disengaged.

The HMI 226 can include one or more displays that provide warnings or requests to the driver. The HMI 226 can include one or more visual warning devices within the vehicle, such as a heads up display or an instrument cluster. The HMI can also issue auditory warnings that can be transmitted by a standard vehicle audio system, an audio loudspeaker, a piezoelectric transducer, magnetostrictive transducer, electrostatic transducer, or other sound transducer.

The HMI 226 can receive signals regarding the CLC, DALC, HMI Steering Interaction (HASIS), and HMI Attention Display (HAD) warnings and display them to the driver. In some implementations, the HASIS can include a current or future steering state of the driver that indicates what the driver is doing and/or what the driver should be doing with regard to steering. In some aspects, the HASIS state displayed at the HMI are referred to as steering warnings. In an implementation, the HASIS state of HANDS_FREE_OK can prompt the HMI 226 to display a message to the driver that removing hands from the steering wheel is acceptable. In addition, the HASIS state of DRIVER_HAS_HANDS_ON can indicate that the driver is grasping the steering wheel. Another example of a HASIS state can be DRI- VER_MUST_HANDS_ON, which can mean that the driver is required to have hands on the steering wheel to be prepared to take steering control of the vehicle for an upcoming threat. The HASIS state of DRIVER_IS_STEERING can indicate that the driver is actively steering the vehicle. The HASIS state of DRIVER_MUST_STEER can indicate that the driver is required to steer the vehicle, such as at times when the DALC is MANUAL. The HASIS state of LTC_BLOCKED_BY_STEERING can issue a warning to prompt the driver to demonstrate positive steering control before offering a higher level of automation.

The HMI 226 can also issue HAD warning signals to alert a driver to provide a level of attentiveness. In some aspects, the HAD states displayed at the HMI 226 are referred to as attention warnings. For example, for a HAD value of EYES_ON_ROAD_WARN, the HMI 226 can prompt the driver to put his or her eyes on the road and can be initiated when the TC of an upcoming threat is less than or equal to the DAT, EORW, or HOWT. In addition, for an HAD value of LTC_BLOCKED_BY_INATTENTION, the HMI 226 can let the driver know that a higher level of automation is being blocked due to an upcoming threat that may not be recognized due to inattention of the driver. The HAD value can also be set to NONE, which can mean that a current or future driving state is not prompting a HAD warning.

Figure 3:
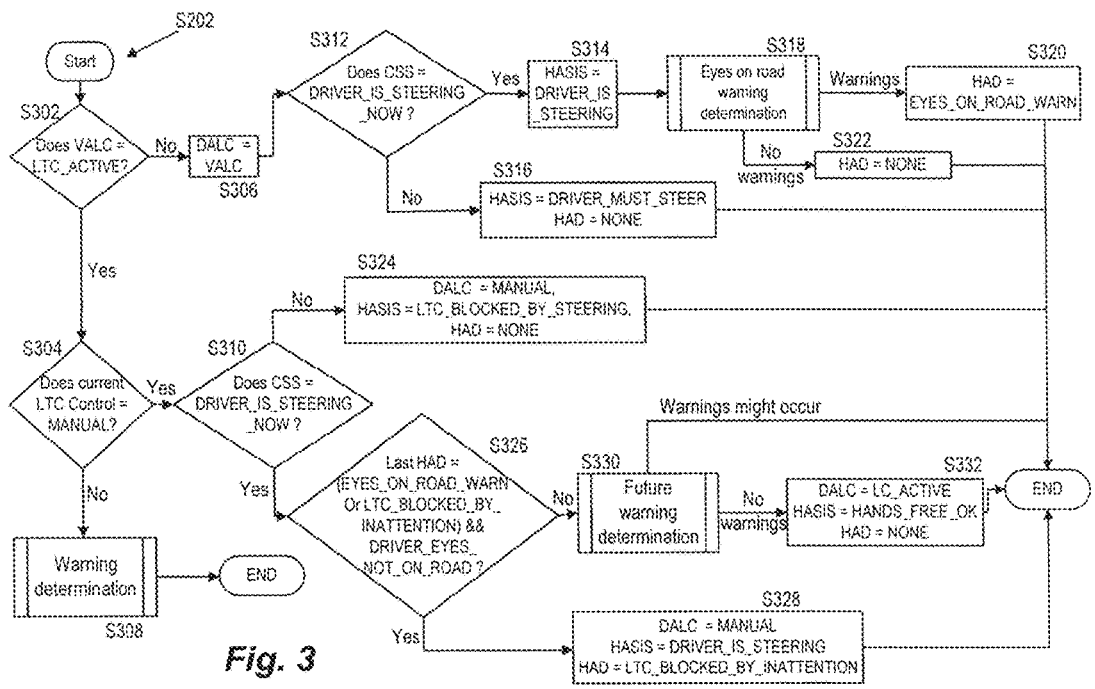
FIG. 3 is an exemplary flowchart of a calculation of allowable driving states.

FIG. 3 is an exemplary flowchart of the calculation of allowable driving states of step S202. The calculation of allowable driving states process S202 can also include determining outputs to the HMI 226. At step S302, the processing circuitry determines whether the vehicle control state that can be provided at the next time step (VALC) is currently set to LTC_ACTIVE. If the VALC is currently set to LTC_ACTIVE, resulting in a "yes" at step S302, which can mean that the LTC system is available to actively steer the vehicle, then step S304 is executed. Otherwise, if the VALC is set to OFF, MANUAL, CO_STEER, or any other value that is not LTC_ACTIVE, resulting in a "no" at step S302, then step S306 is executed.

At step S304, it is determined whether the current LTC state is set to MANUAL. If the current LTC state is set to MANUAL, resulting in a "yes" at step S304, meaning that the driver is steering the vehicle with the LTC system on and sensing, then step S310 is executed where the processing circuitry can determine whether to offer LTC control to the driver or to remain in MANUAL. In some implementations, the VALC can be set to LTC_ACTIVE if the CLC is set to MANUAL or LTC_ACTIVE. Therefore, if the current LTC is not set to MANUAL, resulting in a "no" at step S304, then step S308 is performed. At step S308, it is determined whether any warnings will result if the current LTC state is continued. Details regarding step S308 are explained further with respect to FIG. 4.

At step S306, if the VALC is set to a value other than LTC_ACTIVE, resulting in a "no" at step S302, then the DALC is set to the same value as the VALC, which can mean that the next allowable driving state is set to be the least restrictive allowable driving state that can be offered by the SAMM.

At step S312, it is determined whether the driver is actively steering the vehicle, which can result in a CSS of DRIVER_IS_STEERING_NOW. If the driver is actively steering the vehicle, resulting in a "yes" at step S312, then step S314 is executed. However, if the driver is not actively steering the vehicle, resulting in a "no" at step S312, then step S316 is executed. At step S316, the HASIS value is set to DRIVER_MUST_STEER, and the HAD value is set to NONE. The processing circuitry of the SAMM sends control signals to the HMI 226 to prompt the driver to actively steer the vehicle. At step S314, the HASIS value is set to DRIVER_IS_STEERING, and the HMI 226 can display a message to the driver that indicates that the driver has steering control of the vehicle.

After the HASIS value is set to DRIVER_IS_STEERING, at step S318, a determination is made regarding whether or not the driver should be issued a warning to put eyes on the road. Details regarding step S318 are explained further with respect to FIG. 5. If it is determined at step S318 that the HAD value should be set to EYES_ON_ROAD_WARN, then a warning is issued at the HMI 226 and step S320 is executed. Otherwise, if it is determined at step S318 that a warning to place eyes on the road does not need to be displayed at the HMI 226, resulting in a "NO," then step S322 is executed.

At step S320, the HAD value is set to EYES_ON_ROAD_WARN, and a HMI warning is generated to prompt the driver to place eyes on the road. At step S322, the HAD value is set to NONE if no HMI warning is generated at step S318, which can result if the TC for current and upcoming threats is greater than the DAT and the EORW.

If the determination is made at step S304 that the current LTC state is set to MANUAL, then step S310 is executed. At step S310, it is determined whether the driver is actively steering the vehicle, which can result in a CSS of DRIVER_IS_STEERING_NOW. If the driver is actively steering the vehicle, resulting in a "yes" at step S310, then step S326 is executed. However, if the driver is not actively steering the vehicle, resulting in a "no" at step S310, then step S324 is executed.

At step S324, the DALC is set to MANUAL, the HASIS value is set to LTC_BLOCKED_BY_STEERING, and the HAD value is set to NONE if it is determined that the driver is not currently steering the vehicle at step S310. This can mean that even though the vehicle can offer the LTC_ACTIVE driving state in the next time step based on upcoming threats, sensor performance, and the like, the driver will not be offered the LTC_ACTIVE driving state until the driver demonstrates that he or she is actively steering the vehicle. The HMI 226 can display a warning such as "LTC control blocked until driver steers" to prompt the driver to demonstrate steering control of the vehicle.

Step S326 is executed if the determination is made at step S310 that the driver is currently steering the vehicle. At step S326, it is determined if the last HAD value was set to EYES_ON_ROAD_WARN or LTC_BLOCKED_BY_INATTENTION and if the driver's eyes are currently not on the road, which can mean that the driver has not obeyed a previous warning. If the driver does not have eyes on the road and the eyes on the road warning was the last HAD warning that was issued, resulting in a "yes" at step S326, then step S328 is executed and the HAD state is set to LTC_BLOCKED_BY_INTTENTION. Otherwise, if the driver has eyes on the road or had not received the eyes on the road warning as the last HAD warning, resulting in a "no" at step S330 is executed.

Step S328 is performed in order to prompt the driver to place eyes on the road if the driver does not currently have eyes on the road and the last HAD warning the driver received was a warning to place eyes on the road. The DALC is set to MANUAL, which can indicate that LTC_ACTIVE can be withheld from the driver until the eyes on the road warning is obeyed. The HASIS value is set to DRIVER_IS_STEERING to indicate to the driver that the driver is actively steering the vehicle. In addition, the HAD warning value is set to LTC_BLOCKED_BY_INATTEN- TION so that the driver can be informed by the HMI 226 that LTC could be offered if the driver were to place their eyes on the road.

At step S330, the processing circuitry determines whether warnings may be issued in the future if a higher level of automation is offered to the driver. Details regarding step S330 are explained further with respect to FIGS. 6A and 6B. If offering a higher level of automation to the driver, such as LTC_ACTIVE, will not result in warnings for a predetermined amount of time into the future, then step S332 is performed.

At step S332, the DALC can be set to LTC_ACTIVE, the HASIS value can be set to HANDS_FREE_OK, and the HAD warning value can be set to NONE. The less restrictive driving state can be offered to the driver based on the driver complying with previous requests by the SAMM and no warnings being issued for a predetermined amount of time with the higher level of automation.

Figure 4A:
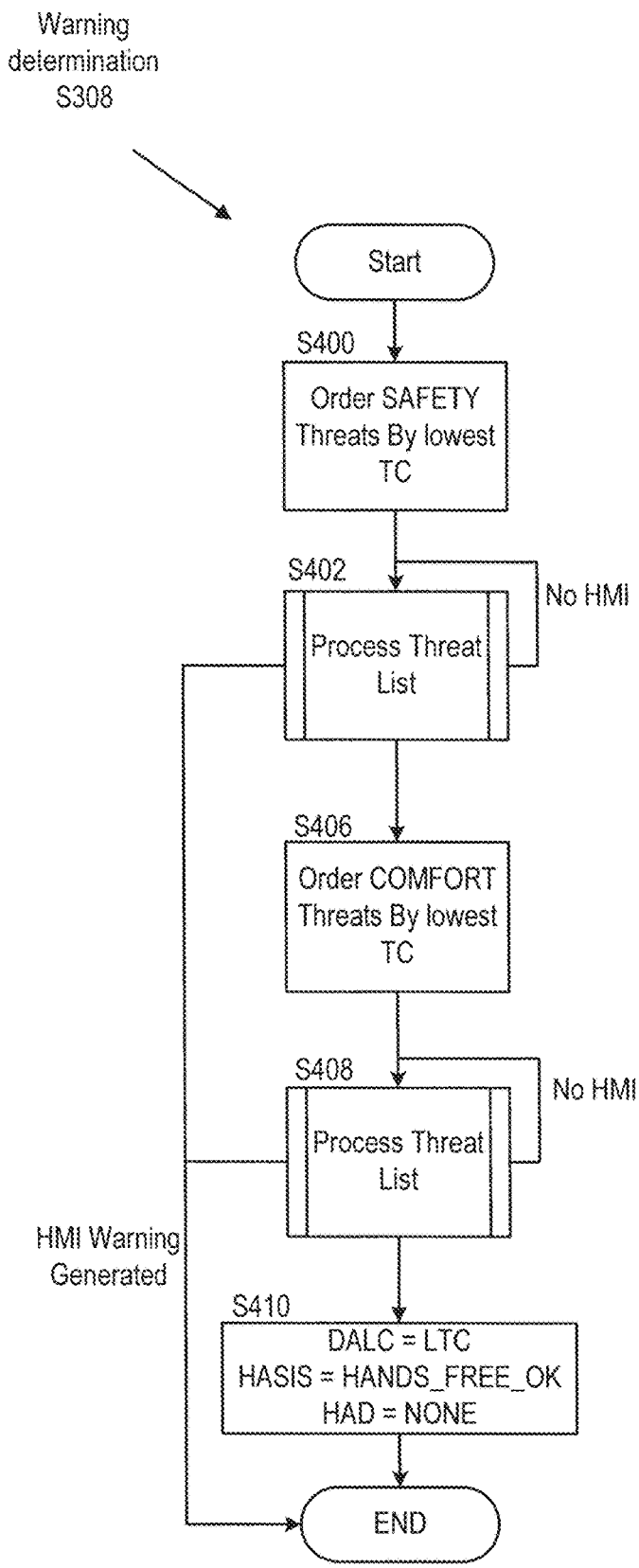
FIGS. 4A and 4B are exemplary flowcharts of a warning determination.

FIG. 4A is an exemplary flowchart of a warning determination at step S308. At step S400, the threats that are assigned a consequence level of safety are ordered from lowest TC to highest TC, which prioritizes the threats with the shortest time to occurrence over threats that may have a longer time to occurrence. For example, a threat of a sharp curve that is scheduled to occur in ten seconds based on the distance and current vehicle speed is given a higher priority over a threat of a lane merge that is estimated to occur one minute in the future.

At step S402, the safety threat list is processed to determine whether a HMI warning should be generated for the threats based on the desired driving states (e.g. DRIVER_MUST_HANDS_ON) for the threats and the driver's response time. Details regarding step S402 are explained further with respect to FIG. 4B. According to an implementation, the threat list is processed in priority order so that the higher priority threats are processed before the lower priority threats. If the result of step S402 for a threat does not produce a HMI warning, the next highest priority threat is processed at step S402. If a threat that is processed generates a HMI warning, the warning is output to the HMI 226, and the process at step S308 is terminated. However, if all of the threats on the safety threat list have been processed and a HMI warning has not been generated, then step S406 is performed.

At step S406, the threats that are assigned a consequence level of comfort (i.e. the consequence is a reduction in driver comfort, but not in safety) are ordered from lowest TC to highest TC, which prioritizes the threats with the shortest time to occurrence over threats that may have a longer time to occurrence. For example, an upcoming comfort threat could be that the vehicle is scheduled to encounter a highway on-ramp in two minutes where other vehicles could be merging into the rightmost lane highway where the vehicle is driving that may prompt the vehicle to change lanes.

After the comfort threats have been ordered from lowest TC to highest TC, step S408 is executed to process the comfort threat list. In an implementation, the steps to process the comfort threat list are the same steps to process the safety threat list at step S402. Details regarding step S408 are explained further with respect to FIG. 4B. According to an implementation, the threat list is processed in priority order so that the higher priority threats are processed before the lower priority threats. If the result of step S408 for a threat does not produce a HMI warning, the next highest priority threat is processed. If a threat that is processed generates a HMI warning, the warning is output to the HMI 226, and the process at step S308 is terminated. However, if all of the threats on the comfort threat list have been processed and a HMI warning has not been generated, then step S410 is performed.

At step S410, the DALC is set to LTC_ACTIVE, the HASIS value is set to HANDS_FREE_OK, and the HAD value is set to NONE if none of the current or upcoming safety threats will produce a warning at the HMI 226. In an implementation, if for each threat that is processed at step S402 or S408, the TC and desired action by the driver do not generate any HMI warnings, the driver can be offered a higher level of steering automation, such as LTC_ACTIVE, and the driver can be permitted to take hands off the steering wheel.

Figure 4B:
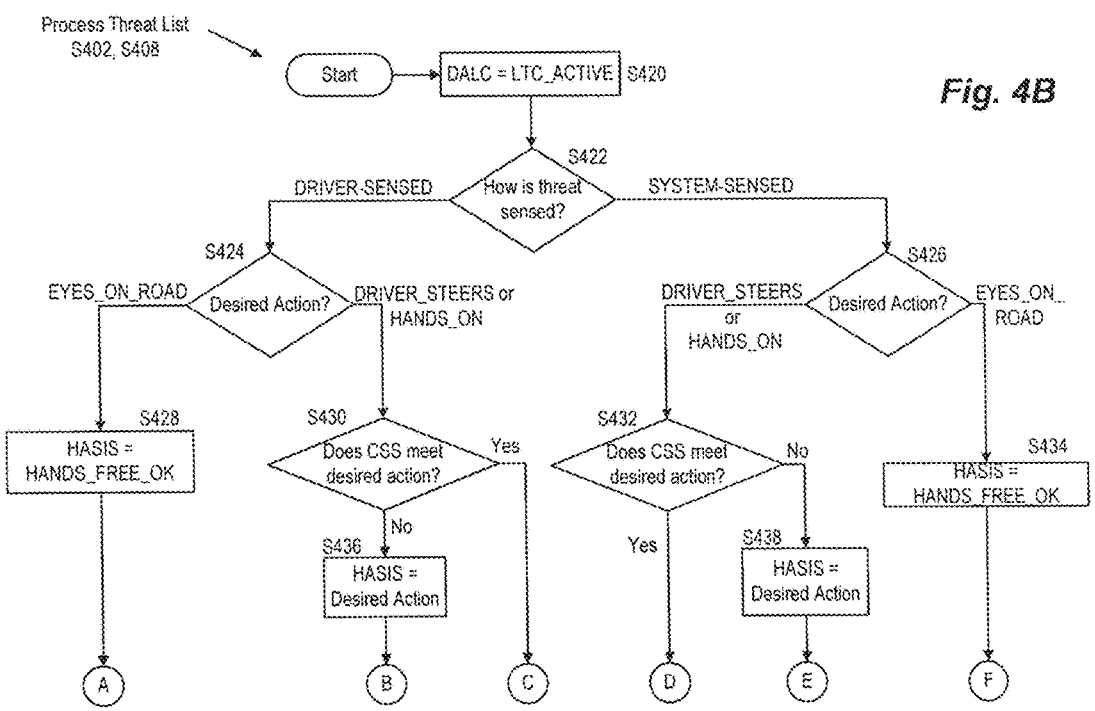
Figure 4B:
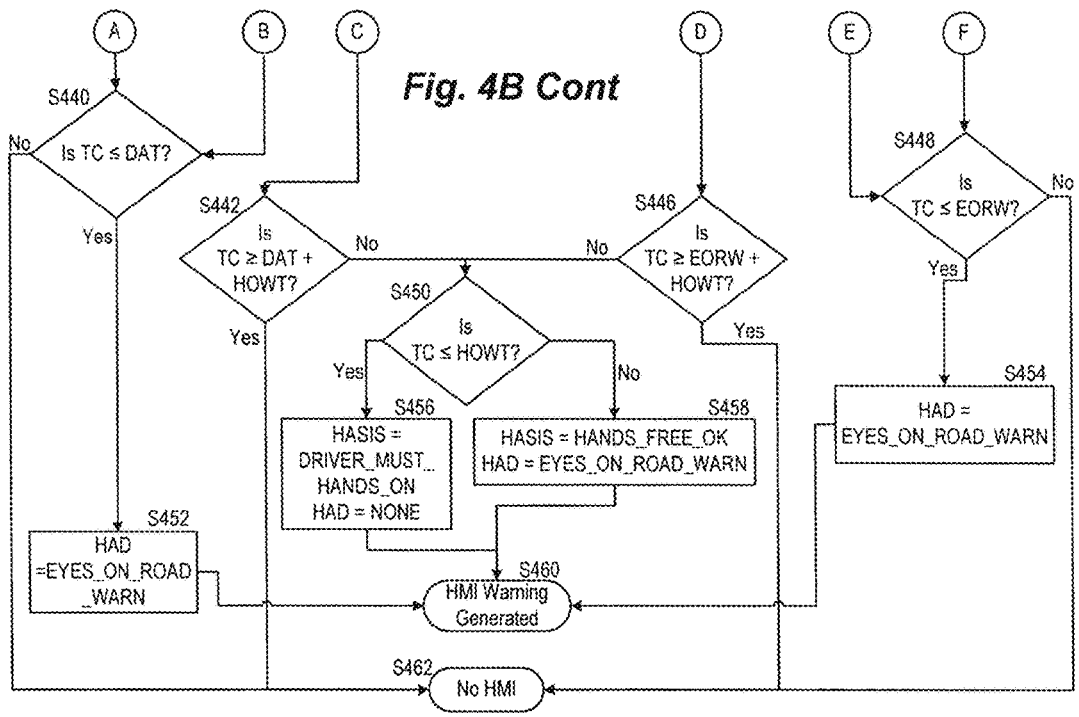

FIG. 4B is an exemplary flowchart that illustrates how threats are processed at steps S402 and S408. At step S420, the DALC is set to LTC_ACTIVE, which can indicate that the driver can be offered the LTC_ACTIVE driving state at the next time step.

At step S422, the processing circuitry determines how the threat is sensed. If the threat is driver-sensed, then step S424 is performed. In an implementation, examples of driver-sensed threats can include the presence of construction barrels on the road or a road departure in an area where lane markings are too faded to be sensed that are recognized by the driver. However, if the threat is system-sensed, then step S426 is performed. In an implementation, an example of a system-sensed threat can include an extreme road-curvature a forward camera or determined based on correlation of a GPS position with the stored map data.

At steps S424, a desired action for the driver-sensed threat is determined. If the desired action for the threat being processed is for the driver to place eyes on the road, then step S428 is performed. In an implementation, a threat that can have a desired action of placing eyes on the road can be a threat that may have a TC that is long enough for the driver to respond but may require the driver to be alert and paying attention to the road. However, if the desired action for the threat being processed is for the driver to steer or place hands on the vehicle, then step S430 is performed.

At step S428, if the threat is driver-sensed and has a desired action of placing eyes on the road, then the HASIS value is set to HANDS_FREE_OK to indicate to the driver that it is acceptable to keep hands off the steering wheel. If the threat is driver-sensed and has a desired action of the driver steering or placing hands on the steering wheel, then at step S430, it is determined whether the CSS meets the desired action for the threat that is being processed. For example, if the CSS is HANDS_FREE and the desired action is HANDS_ON, resulting in a "no" at step S430, then step S436 is performed. Otherwise, if the CSS matches the desired action for the threat, resulting in a "yes" at step S430, then step S442 is performed.

At step S436, the HASIS value is set to the desired action for the threat if the CSS does not match the desired action for the threat. For example, the HASIS value can be set to DRIVER_IS_STEERING if the desired action if for the driver to steer or to DRIVER_HAS_HANDS_ON if the desired action of for the driver to put hands on the steering wheel.

At step S440, it is determined if the TC for the threat is less than or equal to the DAT, which is estimated time that an unprompted driver will look at the road again according to an implementation. If the TC for the threat is less than or equal to the DAT, resulting in a "yes" at step S440, then step S452 is performed. If the TC is less than or equal to the DAT, then it can be estimated that an unprompted driver may not look at the road before the time that the threat will occur and a warning may be necessary to alert the driver. At step S452, the HAD value is set to EYES_ON_ROAD_WARN, and at step S460, the HMI warning is generated to warn the driver to put eyes on the road.

Otherwise, if at step S440 the TC is greater than the DAT, resulting in a "no" at step S440, then step S462 is performed. If the TC is greater than the DAT, then it can be estimated that an unprompted driver will look at the road before the time that the threat will occur and a warning may not be necessary to alert the driver. At step S462, a HMI is not generated, and the processing of the threat is complete.

Step S442 is performed if the CSS matches the desired action for the threat at step S430. The processing circuitry determines if the TC is greater than or equal to the estimated amount of time for an unprompted driver to look at the road (DAT) plus the estimated time for the driver to return hands to the steering wheel (HOWT). If the TC is greater than or equal to the DAT plus the HOWT, resulting in a "yes" at step S442, then step S462 is performed and no HMI warning is generated. If the TC is greater than or equal to the DAT plus the HOWT, then it can be estimated that an unprompted driver can look at the road and put hands on the steering wheel before the threat occurs.

Otherwise, if the TC is less than the DAT plus the HOWT, resulting in a "no" at step S442, then step S450 is executed. If the TC is less than the DAT plus the HOWT, then it can be estimated that an unprompted driver may not look at the road and put hands on the steering wheel before the threat occurs.

At step S450, it is determined if the TC is less than or equal to the HOWT. If the TC is less than the estimated time for the driver to return hands to the steering wheel, resulting in a "yes" at step S450, then the driver may not be able to return hands to the steering wheel before the threat occurs, and step S456 is executed. At step S456, the HASIS value is set to DRIVER_MUST_HAVE_HANDS_ON, and the HAD value is set to NONE, and the HMI warning is generated at step S460 for the driver to place hands on the steering wheel.

If the TC is less than the estimated time for the driver to return hands to the steering wheel, resulting in a "no" at step S450, then step S458 is executed. According to an implementation, step S458 is performed if the driver may place hands on the steering wheel before the threat occurs but may not be able to look back at the road and identify he threat and place hands on the steering wheel before the threat occurs. At step S458, the HASIS value is set to HANDS_FREE_OK, and the HAD value is set to EYES_ON_ROAD_WARN. At step S460, the HMI warning is generated to prompt the driver to place eyes on the road.

At step S426, a desired action for the system-sensed threat is determined. If the desired action for the threat being processed is for the driver to place eyes on the road, then step S434 is performed. However, if the desired action for the threat being processed is for the driver to steer or place hands on the vehicle, then step S432 is performed. In an implementation, a threat that can have the desired action of the driver steering or placing hands on the steering wheel can be a threat with a TC that is less than the time it takes the driver to place eyes on the road plus the amount of time it takes the driver to place hands on the steering wheel.

At step S434, if the threat is system-sensed and has a desired action of placing eyes on the road, then the HASIS value is set to HANDS_FREE_OK to indicate to the driver that it is acceptable to keep hands off the steering wheel. If the threat is system-sensed and has a desired action of the driver steering or placing hands on the steering wheel, then at step S432, it is determined whether the CSS meets the desired action for the threat that is being processed. For example, if the CSS is HANDS_FREE and the desired action is HANDS_ON, resulting in a "no" at step S432, then step S438 is performed. Otherwise, if the CSS matches the desired action for the threat, resulting in a "yes" at step S432, then step S446 is performed.

At step S438, the HASIS value is set to the desired action for the threat if the CLC does not match the desired action for the threat. For example, the HASIS value can be set to DRIVER_IS_STEERING if the desired action if for the driver to steer or to DRIVER_HAS_HANDS_ON if the desired action of for the driver to put hands on the steering wheel.

At step S448, it is determined if the TC for the threat is less than or equal to the EORW, which is the estimated time that the driver will look at the road after being prompted according to an implementation. If the TC for the threat is less than or equal to the EORW, resulting in a "yes" at step S448, then step S454 is performed. If the TC is less than or equal to the EORW, then it can be estimated that a driver who is prompted to look at the road may not look at the road before the time that the threat will occur, and a warning may be necessary to alert the driver. At step S454, the HAD value is set to EYES_ON_ROAD_WARN, and at step S460, the HMI warning is generated to warn the driver to put eyes on the road.

If at step S448, the TC is greater than the EORW, resulting in a "no" at step S448, then step S462 is performed, and a HMI warning is not generated. If the TC is greater than the DAT, then it can be estimated that an unprompted driver will look at the road before the time that the threat will occur and a warning may not be necessary to alert the driver.

Step S446 is performed if the CSS matches the desired action for the threat at step S432. The processing circuitry determines if the TC is greater than or equal to the estimated amount of time for a prompted driver to look at the road (EORW) plus the estimated time for the driver to return hands to the steering wheel (HOWT). If the TC is greater than or equal to the EORW plus the HOWT, resulting in a "yes" at step S446, then step S462 is performed and no HMI warning is generated. If the TC is greater than or equal to the EORW plus the HOWT, then it can be estimated that an unprompted driver can look at the road and put hands on the steering wheel before the threat occurs.

Otherwise, if the TC is less than the DAT plus the HOWT, resulting in a "no" at step S446, then step S450 is executed as previously discussed. If the TC is less than the EORW plus the HOWT, then it can be estimated that a driver who is prompted may not look at the road and put hands on the steering wheel before the threat occurs.

Figure 5A:
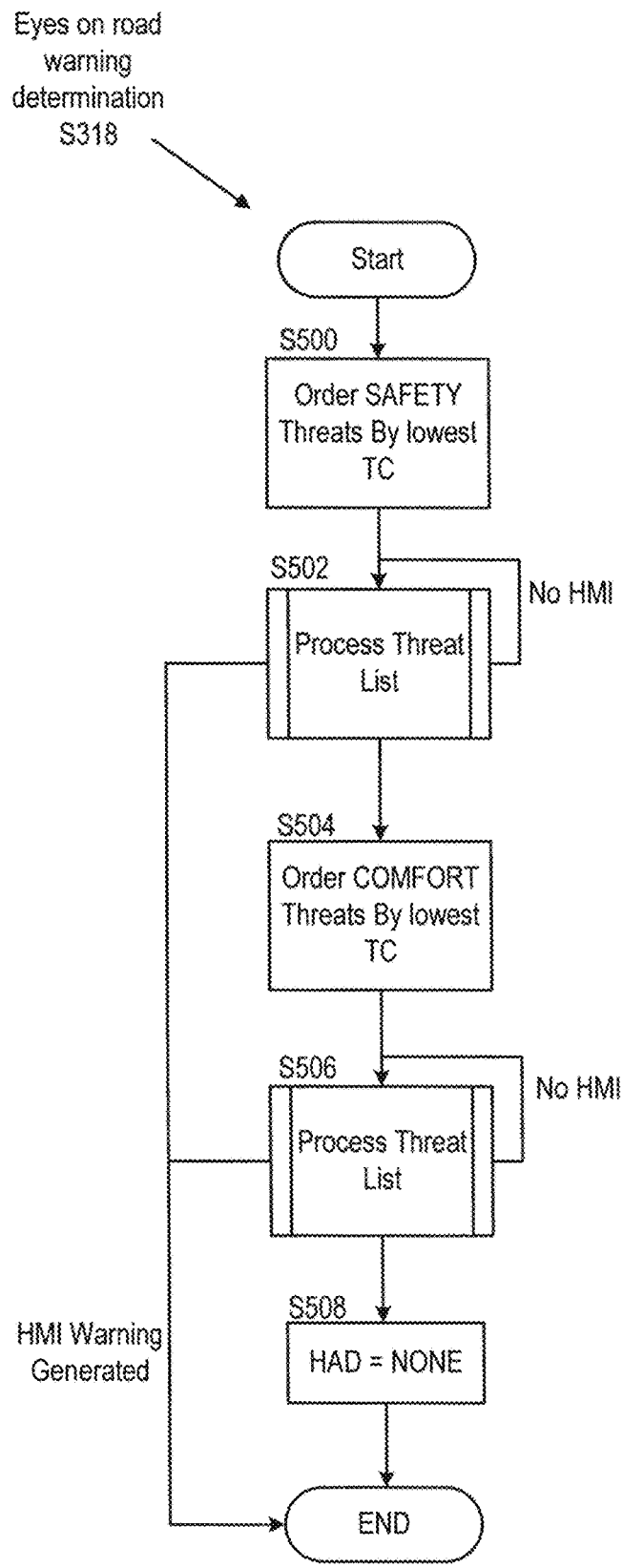
FIGS. 5A and 5B are exemplary flowcharts of an eyes on the road warning determination.

FIG. 5A is an exemplary flowchart of a determination of whether or not the driver should be issued a warning to put eyes on the road at step S318. At step S500, the threats that are assigned a consequence level of safety are ordered from lowest TC to highest TC, which prioritizes the threats with the shortest time to occurrence over threats that may have a longer time to occurrence. For example, a threat of a sharp curve that is scheduled to occur in thirty seconds based on the distance and current vehicle speed is given a higher priority over a threat of a lane merge that is estimated to occur one minute in the future.

At step S502, the safety threat list is processed to determine whether a HMI warning should be generated for the threats based on the desired actions for the threats and the driver's response time. Details regarding step S502 are explained further with respect to FIG. 5B. According to an implementation, the threat list is processed in priority order so that the higher priority threats are processed before the lower priority threats. If the result of step S502 for a threat does not produce a HMI warning, the next highest priority threat is processed at step S502. If a threat that is processed generates a HMI warning, the warning is output to the HMI 226, and the process at step S318 is terminated. However, if all of the threats on the safety threat list have been processed and a HMI warning has not been generated, then step S504 is performed.

At step S504, the threats that are assigned a consequence level of comfort are ordered from lowest TC to highest TC, which prioritizes the threats with the shortest time to occurrence over threats that may have a longer time to occurrence. For example, an upcoming comfort threat could be that the vehicle is scheduled to encounter a highway on-ramp in two minutes where other vehicles could be merging into the rightmost lane highway where the vehicle is driving that may prompt the vehicle to change lanes.

After the comfort threats have been ordered from lowest TC to highest TC, step S506 is executed to process the comfort threat list. In an implementation, the steps to process the comfort threat list are the same steps to process the safety threat list at step S502. Details regarding step S506 are explained further with respect to FIG. 5B. According to an implementation, the threat list is processed in priority order so that the higher priority threats are processed before the lower priority threats. If the result of step S506 for a threat does not produce a HMI warning, the next highest priority threat is processed. If a threat that is processed generates a HMI warning, the warning is output to the HMI 226, and the process at step S318 is terminated. However, if all of the threats on the comfort threat list have been processed and a HMI warning has not been generated, then step S508 is performed.

At step S508, the HAD value is set to NONE if none of the current or upcoming safety threats will produce an eyes on the road warning at the HMI 226. In an implementation, if for each threat that is processed at step S502 or S506, the TC is greater than the DAT for a driver-sensed threat and greater than or equal to the EORW for a system-sensed threat, then no HMI warning is generated.

Figure 5B:
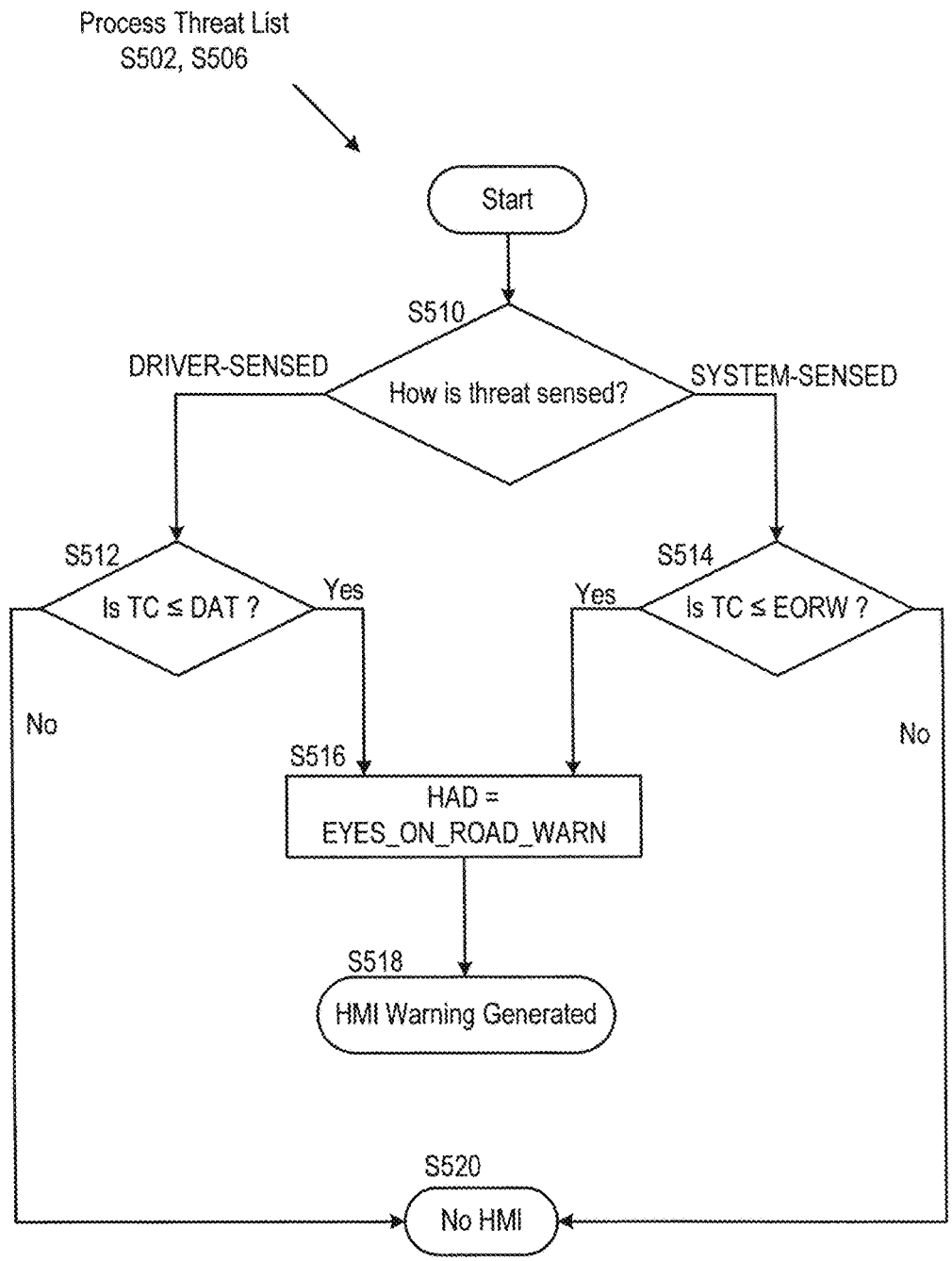

FIG. 5B is an exemplary flowchart that illustrates how threats are processed at steps S502 and S506. At step S510, the processing circuitry determines how the threat is sensed. If the threat is driver-sensed, then step S512 is performed. However, if the threat is system-sensed, then step S514 is performed.

At step S512, for a driver-sensed threat, it is determined if the TC for the threat is less than or equal to the DAT, which is estimated time that an unprompted driver will look at the road again, according to an implementation. If the TC for the threat is greater than the DAT, resulting in a "no" at step S512, then step S520 is performed. If the TC is greater than the DAT, then it can be estimated that an unprompted driver will look at the road before the time that the threat will occur and a warning may not be necessary to alert the driver. At step S520, a HMI is not generated, and the processing of the threat is complete. Otherwise, if the TC for the threat is less than or equal than the DAT, resulting in a "yes" at step S512, then step 516 is performed.

At step S514, if the threat is system-sensed, it is determined if the TC for the threat is less than or equal to the EORW, which is the estimated time that the driver will look at the road after being prompted, according to an implementation. If the TC for the threat is greater than the EORW, resulting in a "no" at step S514, then step S520 is performed.

If the TC is greater than the EORW, then it can be estimated that a prompted driver will look at the road before the time that the threat will occur and a warning may not be necessary to alert the driver. At step S520, a HMI is not generated, and the processing of the threat is complete. Otherwise, if the TC for the threat is less than or equal than the EORW, resulting in a "no" at step S512, then step 516 is performed.

At step S516, the HAD value is set to EYES_ON_ROAD_WARN, and at step S518, the HMI warning is generated to warn the driver to put eyes on the road. If the TC is less than or equal to the DAT or the EORW, then it can be estimated that an unprompted or a prompted driver may not look at the road before the time that the threat will occur and a warning may be necessary to alert the driver.

Figure 6A:
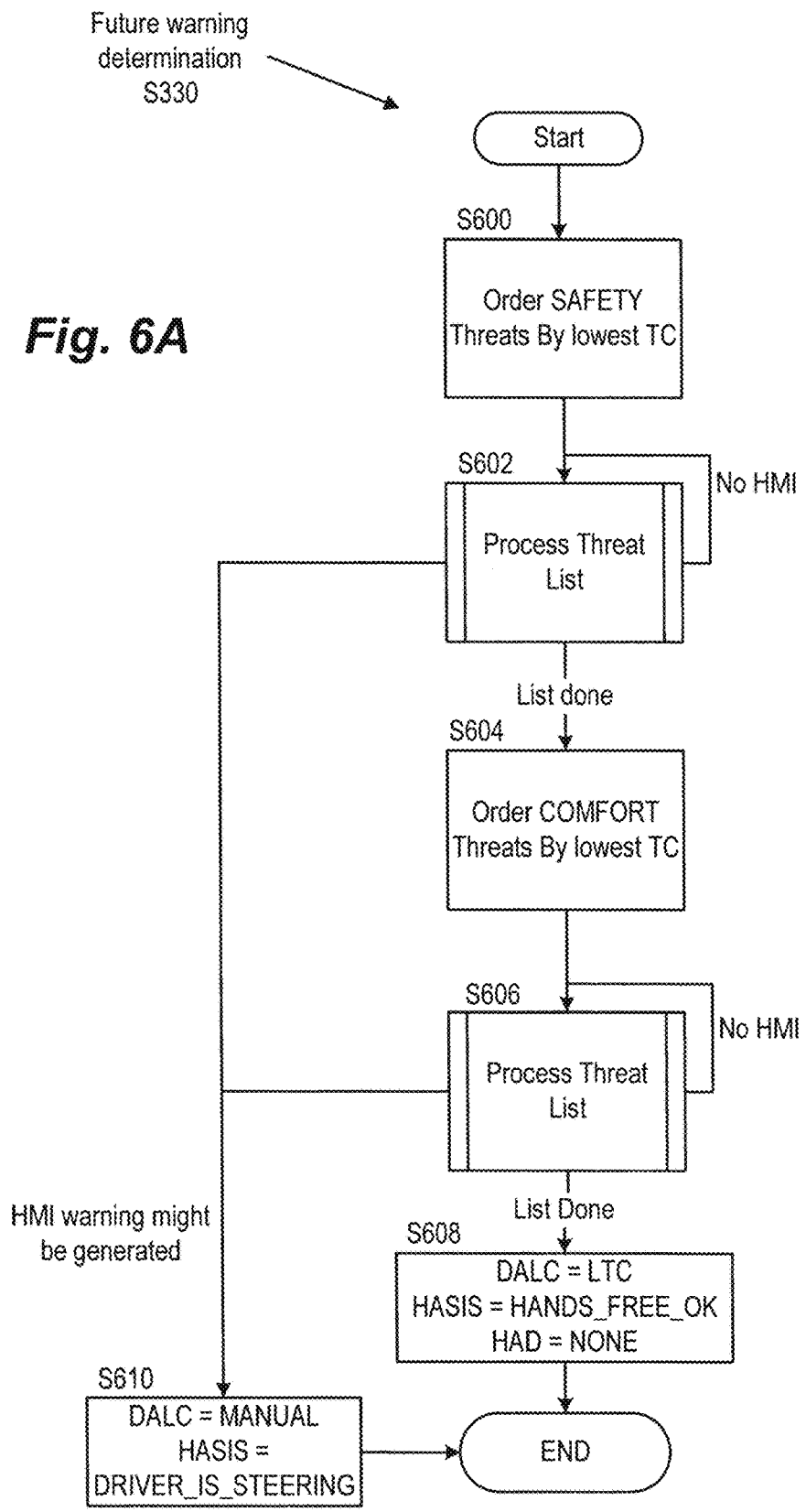
FIGS. 6A and 6B are exemplary flowcharts of a future warning determination.
Figure 6B:
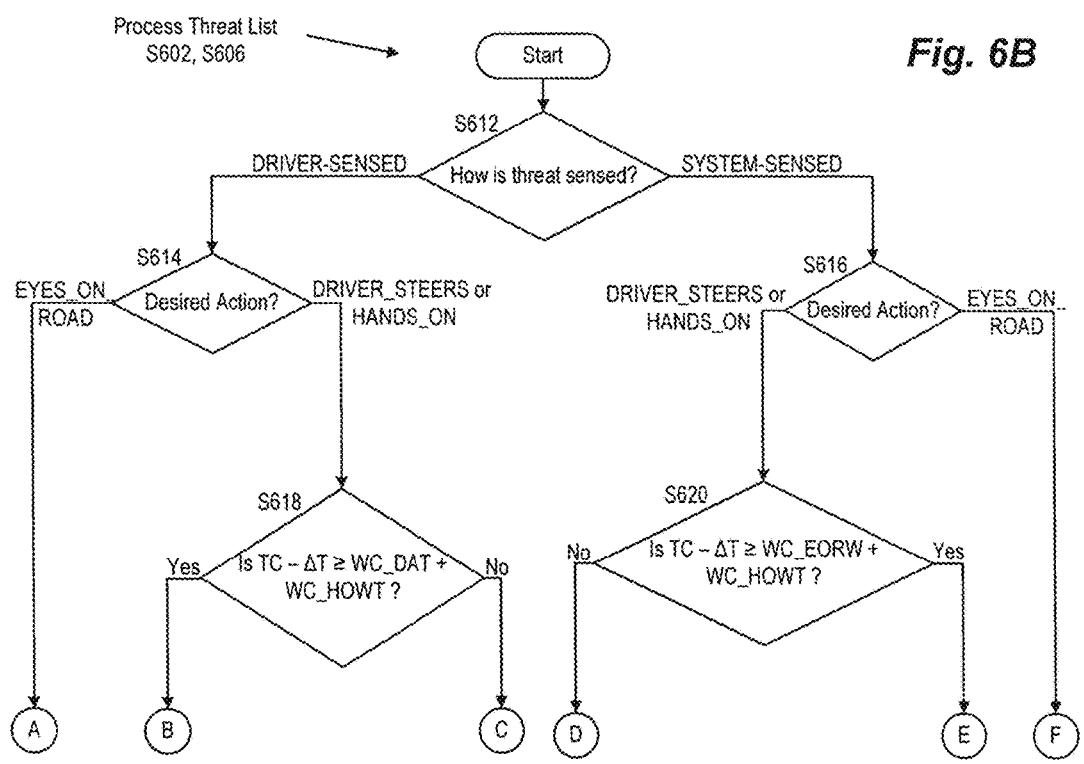
Figure 6B:
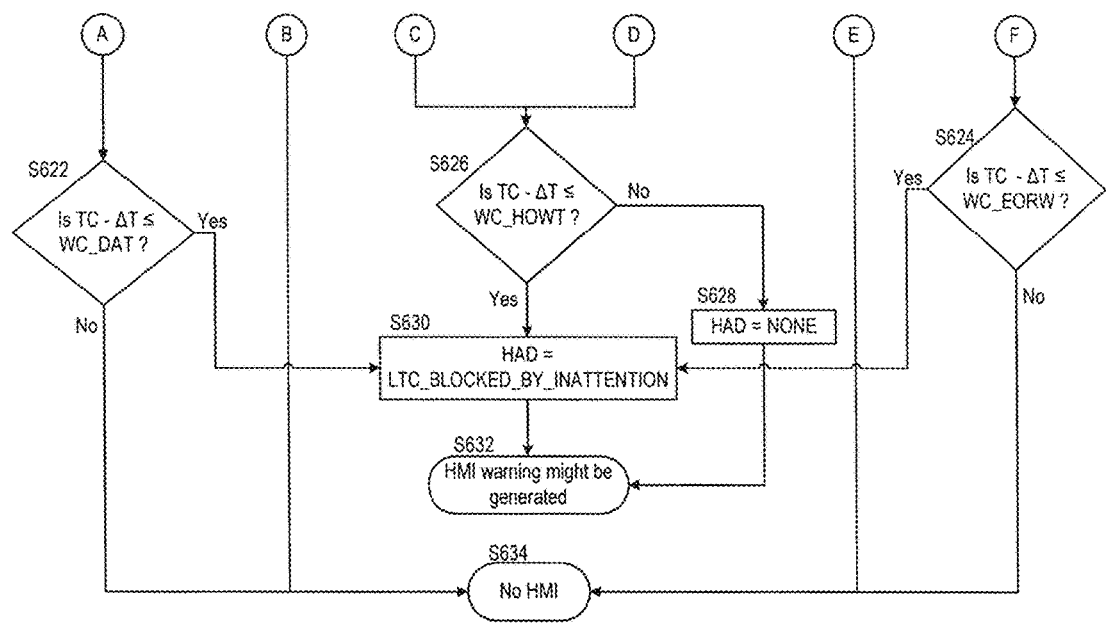

FIGS. 6A and 6B are exemplary flowcharts of a future warning determination of step S330. At step S600, the threats that are assigned a consequence level of safety are ordered from lowest TC to highest TC, which prioritizes the threats with the shortest time to occurrence over threats that may have a longer time to occurrence. For example, a threat of a sharp curve that is scheduled to occur in thirty seconds based on the distance and current vehicle speed is given a higher priority over a threat of a lane merge that is estimated to occur one minute in the future.

At step S602, the safety threat list is processed to determine whether a HMI warning might occur during a predetermined period of time in the future based on the desired actions to respond to the threats and the driver's response time. In an embodiment, the predetermined period of time that is checked to be free of warnings can be referred to as $\Delta T$. In an implementation, $\Delta T$ can be any value between 1 and 10 seconds, but $\Delta T$ can be any period of time that can ensure that warnings will not be generated immediately after offering a higher level of steering automation to the driver. Details regarding step S602 are explained further with respect to FIG. 6B. According to an implementation, the threat list is processed in priority order so that the higher priority threats are processed before the lower priority threats. If the result of step S602 for a threat does not produce a HMI warning, the next highest priority threat is processed at step S602. If a threat that is processed might generate a HMI warning during time $\Delta T$, then step S610 is performed. However, if all of the threats on the safety threat list have been processed and it is determined that a HMI warning may not been generated, then step S604 is performed.

At step S604, the threats that are assigned a consequence level of comfort are ordered from lowest TC to highest TC, which prioritizes the threats with the shortest time to occurrence over threats that may have a longer time to occurrence. For example, an upcoming comfort threat could be that the vehicle is scheduled to encounter a highway on-ramp in two minutes where other vehicles could be merging into the rightmost lane highway where the vehicle is driving that may prompt the vehicle to change lanes.

After the comfort threats have been ordered from lowest TC to highest TC, step S606 is executed to process the comfort threat list. In an implementation, the steps to process the comfort threat list are the same steps to process the safety threat list at step S602. Details regarding step S606 are explained further with respect to FIG. 6B. According to an implementation, the threat list is processed in priority order so that the higher priority threats are processed before the lower priority threats. If the result of step S606 for a threat does not produce a HMI warning, the next highest priority threat is processed. If a threat that is processed might generate a HMI warning during time $\Delta T$, then step S610 is performed. However, if all of the threats on the comfort threat list have been processed and a HMI warning has not been generated, then step S608 is performed.

At step S608, the DALC is set to LTC_ACTIVE, the HASIS value is set to HANDS_FREE_OK, and the HAD value is set to NONE if none of the current or upcoming safety threats will produce warning at the HMI 226. In an implementation, if for each threat that is processed at step S602 or S606, the TC and desired action by the driver do not generate any HMI warnings for the period of time that is ΔT seconds, the driver can be offered a higher level of steering automation, such as LTC_ACTIVE, and the driver can be permitted to take hands off the steering wheel.

At step S610, if it is determined at step S602 or step S606 that a HMI warning might be generated during the period of time ΔT, the DALC is set to MANUAL, and the HASIS value is set to DRIVER_IS_STEERING. In an implementation the current and upcoming threats may cause a warning to be issued to the driver if the driver is offered a higher level of steering automation, such as LTC_ACTIVE, then the SAMM can maintain the more restrictive driving state.

FIG. 6B is an exemplary flowchart that illustrates how threats are processed at steps S602 and S606. At step S612, the processing circuitry determines how the threat is sensed. If the threat is driver-sensed, then step S614 is performed. However, if the threat is system-sensed, then step S616 is performed.

At steps S614, a desired action for the driver-sensed threat is determined. If the desired action for the threat being processed is for the driver to place eyes on the road, then step S622 is performed. In an implementation, a threat that can have a desired action of placing eyes on the road can be a threat that may have a TC that is long enough for the driver to respond but may require the driver to be alert and paying attention to the road. However, if the desired action for the threat being processed is for the driver to steer or place hands on the vehicle, then step S618 is performed.

At step S622, it is determined if the TC for the threat minus the ΔT seconds that can be free of warnings is less than or equal to a worst case DAT (WC_DAT). The WC_DAT can be an estimated time that an unprompted driver will look at the road again based on a worst case change in driver state over ΔT seconds, according to an implementation. If the TC for the threat minus ΔT is less than or equal to the WC_DAT, resulting in a "yes" at step S622, then step S630 is performed. If the TC minus ΔT is less than or equal to the WC_DAT, then it can be estimated that an unprompted driver may not look at the road before ΔT seconds before the occurrence of the threat consequence.

At step S630, the HAD value is set to LTC_BLOCKED_BY_INATTENTION. For an HAD value of LTC_BLOCKED_BY_INATTENTION, the HMI 226 can alert the driver know that a higher level of automation is being blocked due to an upcoming threat that may not be recognized due to inattention of the driver.

At step S632, the processing circuitry determines that a HMI warning might be generated during the ΔT seconds for the threat being processed at step S602 or S606, which can indicate that a less restrictive driving state should not be offered to the driver because a warning may be generated within ΔT seconds of offering the less restrictive state.

If at step S622, the TC minus the ΔT is greater than the WC_DAT, resulting in a "no" at step S622, then step S634 is performed. If the TC minus the ΔT is greater than the WC_DAT, then it can be estimated that based on a worst case change in attention state, an unprompted driver will look at the road before the time that the threat will occur and a warning will not be generated within the next ΔT seconds. At step S634, a HMI warning is not generated, and the processing of the threat is complete.

If the threat is driver-sensed and has a desired action of the driver steering or placing hands on the steering wheel, then step S618 is performed. At step S618, the processing circuitry determines if the TC minus the ΔT is greater than or equal to the WC_DAT plus the estimated time for the driver to return hands to the steering wheel during a worst-case change in driving state over the ΔT seconds (WC_HOWT). If the TC minus the ΔT is greater than or equal to the WC_DAT plus the WC_HOWT, resulting in a "yes" at step S618, then step S634 is performed and no HMI warning is generated. If the TC minus the ΔT is greater than or equal to the WC_DAT plus the WC_HOWT, then it can be estimated that an unprompted driver can look at the road and put hands on the steering wheel ΔT seconds before the threat occurs if there is a worst case change in driver attention during the ΔT seconds.

If the TC minus the ΔT is less than the WC_DAT plus the WC_HOWT, resulting in a "no" at step S618, then step S626 is executed. If the TC is less than the WC_DAT plus the WC_HOWT, then it can be estimated that less than ΔT seconds may elapse between offering LTC_ACTIVE state and the unprompted driver looking at the road and putting hands on the steering wheel before the threat occurs if there is a worst case change in driver attention during the ΔT seconds.

At step S626, it is determined if the TC minus the ΔT is less than or equal to the WC_HOWT. If the TC minus the ΔT is less than the estimated worst case time for the driver to return hands to the steering wheel, resulting in a "yes" at step S626, then the driver may not be able to return hands to the steering wheel before the threat occurs, and steps S630 and S632 are performed as previously discussed.

If the TC is less than the estimated time for the driver to return hands to the steering wheel, resulting in a "no" at step S626 then step S628 is executed. According to an implementation, step S628 is performed if the driver may place hands on the steering wheel ΔT seconds before the threat occurs but may not be able to both look at the road and place hands on the steering wheel before the threat occurs. At step S628, the HAD value is set to NONE, and at step S632, the processing circuitry determines that a HMI warning might be generated during the ΔT seconds.

At step S616, a desired action for the system-sensed threat is determined. If the desired action for the threat being processed is for the driver to place eyes on the road, then step S624 is performed. However, if the desired action for the threat being processed is for the driver to steer or place hands on the vehicle, then step S620 is performed. In an implementation, a threat that can have the desired action of the driver steering or placing hands on the steering wheel can be a threat with a TC that is less than the time it takes the driver to place eyes on the road plus the amount of time it takes the driver to place hands on the steering wheel.

At step S624, it is determined if the TC for the threat minus the ΔT seconds that can be free of warnings is less than or equal to a worst case EORW (WC_EORW). The WC_EORW can be an estimated time that a driver will look at the road again when prompted based on a worst case change in driver state over ΔT seconds, according to an implementation. If the TC for the threat minus ΔT is less than or equal to the WC_EORW, resulting in a "yes" at step S624, then step S630 is performed. If the TC minus ΔT is less than or equal to the WC_EORW, then it can be estimated that a prompted driver may not look at the road ΔT seconds before the time that the threat will occur, and a warning may be necessary to alert the driver.

At step S630, the HAD value is set to LTC_BLOCKED_BY_INATTENTION. For an HAD value of LTC_BLOCKED_BY_INATTENTION, the HMI 226 can alert the driver know that a higher level of automation is being blocked due to an upcoming threat that may not be recognized due to inattention of the driver.

At step S632, the processing circuitry determines that a HMI warning might be generated during the ΔT seconds for the threat being processed at step S602 or S606, which can indicate that a less restrictive driving state should not be offered to the driver because a warning may result.

If at step S624, the TC minus the ΔT is greater than the WC_EORW, resulting in a "no" at step S624, then step S634 is performed. If the TC minus the ΔT is greater than the WC_EORW, then it can be estimated that based on a worst case change in attention state, a driver who is prompted by an alert or warning at the HMI 226 will look at the road ΔT seconds before the time that the threat. At step S634, a HMI is not generated, and the processing of the threat is complete.

If the threat is system-sensed and has a desired action of the driver steering or placing hands on the steering wheel, then step S620 is performed. At step S620, the processing circuitry determines if the TC minus the ΔT is greater than or equal to the WC_EORW plus the estimated time for the driver to return hands to the steering wheel during a worst-case change in driving state over the ΔT seconds (WC_HOWT). If the TC minus the ΔT is greater than or equal to the WC_EORW plus the WC_HOWT, resulting in a "yes" at step S620, then step S634 is performed and no HMI warning is generated. If the TC minus the ΔT is greater than or equal to the WC_EORW plus the WC_HOWT, then it can be estimated that an unprompted driver can look at the road and put hands on the steering wheel ΔT seconds before the threat occurs if there is a worst case change in driver attention during the ΔT seconds.

If the TC minus the ΔT is less than the WC_EORW plus the WC_HOWT, resulting in a "no" at step S620, then step S626 is performed as previously discussed. If the TC is less than the WC_EORW plus the WC_HOWT, then it can be estimated that an unprompted driver may not look at the road and put hands on the steering wheel ΔT seconds before the threat occurs if there is a worst case change in driver attention during the ΔT seconds.

Figure 7B:
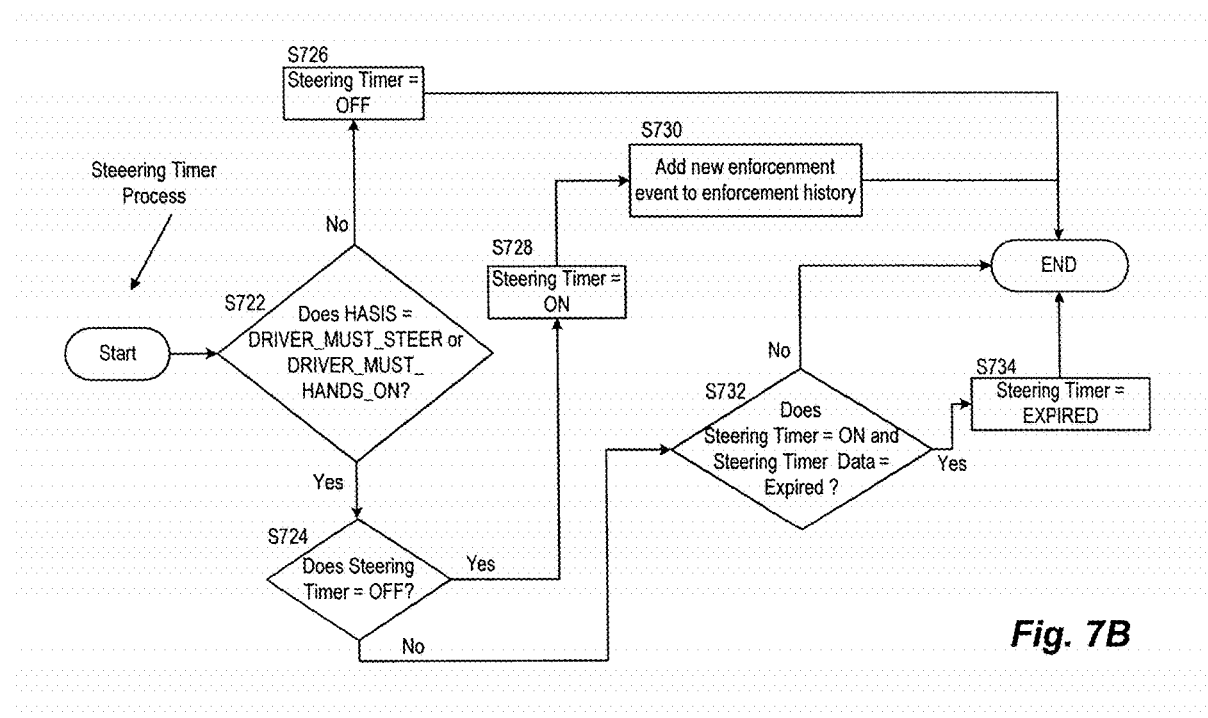
FIG. 7B is an exemplary flowchart of a steering timer process.

FIG. 7A illustrates a flowchart for an enforcement and engagement calculation. At step S702, timers that monitor how long it takes for the driver to respond to steering or attention requests are updated. In an implementation, a steering timer monitors how long it takes a driver to put hands on the steering wheel or actively steer the vehicle after the driver receives a request or warning at the HMI. An attention timer can monitor how long it takes the driver to place eyes on the road after receiving a warning to place eyes on the road. Details regarding the steering timer are discussed further with respect to FIG. 7B.

At step S704, it is determined whether the number of enforcement events in enforcement history is greater than or equal to an enforcement threshold. In an implementation, an enforcement event is a warning or request sent to the driver, such as a warning to place eyes on the road or to steer the vehicle. The enforcement history can be a log of the enforcement events that are sent to a driver along with the time at which the enforcement events occurred that can be stored in memory. The enforcement threshold can be a number of enforcement actions that occur over a predetermined window of time that indicate that the driver may be purposely ignoring the warnings and requests from the SAMM. If the number of enforcement events is greater than or equal to the enforcement threshold, resulting in a "yes" at step S704, then step S706 is performed. Otherwise, if the number of enforcement events is less than the enforcement threshold, resulting in a "no" at step S704, then step S708 is performed.

Step S706 is performed if it is determined that the driver is abusing the system by purposely ignoring warnings and requests from the SAMM. At step S706, it is determined whether the current driving scenario is safe enough to disengage the semi-automatic driving system, which can be based on the number of future threats and the associated TC for each threat according to an implementation. If the current driving scenario is determined to be safe enough to disengage the semi-automatic driving system, resulting in a "yes" at step S706, then step S710 is performed. Otherwise, if the current driving scenario is determined not to be safe enough to disengage the semi-automatic driving system, resulting in a "no" at step S706, then step S712 is performed.

At step S710, the semi-automatic driving system is disengaged by shutting down the semi-automatic driving system, which can include issuing a warning to the driver at the HMI 226 and sending control signals to shut down the semi-automatic driving system. In an implementation where the LTC system is set to LTC_ACTIVE when the disengagement control signal is sent, then the LTC system transitions through the CO-STEER and MANUAL settings before being turned off so it is shut down in a controlled manner.

If it is determined at step S706 that the current driving scenario is not safe enough to disengage the semi-automatic driving system, then at step S712, the engagement status is set to NONE, and no control signal is sent. In an implementation, the current driving scenario can be determined to be not safe enough to disengage the semi-automatic driving system if one or more threats have a TC that is less than a predetermined threshold.

Step S708 is performed if the number of enforcement events in the enforcement history is less than the enforcement threshold. At step S708, it is determined whether the timers that monitor how long it takes for the driver to respond to steering or attention requests have expired. If one of the timers has expired, then a warning or request has been active for a period of time without an action by the driver to comply with the warning or request. For example, if the attention timer is set to twenty seconds, and warning to place eyes on the road has been present for over twenty seconds and the driver has not looked at the road, then the attention timer may have expired. If one of the timers has expired, resulting in a "yes" at step S708, then step S714 is performed. Otherwise, if the timer has not expired, resulting in a "no" at step S708, then step S716 is performed.

At step S714, if one of the timers has expired due to the driver not complying with a warning or request, then a control signal is sent to one or more actuators for steering, brakes, speed control, and the like to implement an enforcement intervention. In an implementation, the enforcement intervention may include sending a control signal to one or more ACC actuators to enforce the warning or request by speed reduction. The ACC set speed can be lowered to a level that may be uncomfortable to the driver to encourage the driver to obey the warning or request. In some aspects, other enforcement interventions can be implemented to induce the driver to comply with the warning or request such as pulsing the brakes, steering the vehicle to create lateral motion that may be uncomfortable to the driver, sounding an alarm or buzzer, turning off peripherals, turning on hazard lights, and the like.

At step S716, if the timers have not expired, the processing circuitry determines whether the LTC system can be engaged based on the allowable driving state that can be offered to the driver and the driver's response. For example, if the current LTC state is set to MANUAL, the driver can be offered the LTC of LTC_ACTIVE at the next time step, and the driver has taken hands off the steering wheel to acknowledge the offer of automatic lane trace control, resulting in a "yes" at step S716, then step S718 is performed. At step S718, the engagement status is set to ENGAGE, and a control signal is sent to engage the LTC system to begin automatic lane trace control.

Otherwise, if the current LTC is not set to MANUAL, the DALC is not set to LTC_ACTIVE, or the driver has not received the offer of automatic lane trace control, resulting in a "no" at step S716, then step S720 is performed. At step 720, the engagement status is set to NONE, and no control signal is sent.

FIG. 7B is an exemplary flowchart of a steering timer process that track how long it takes for the driver to acknowledge warnings pertaining to steering, such as requests from the SAMM to place hands on the steering wheel or steer the vehicle. In some implementations, additional timers, such as an attention timer, can track the status of how long it takes the driver to respond to other warnings. At step S722, it is determined if the HASIS value is set to DRIVER_MUST_STEER or DRIVER_MUST_HANDS_ON, which can indicate to the driver to steer the vehicle or place hands on the steering wheel. In some aspects, each instance of a HASIS signal of DRIVER_MUST_STEER or DRIVER_MUST_HANDS_ON being issued can be considered an enforcement event. If the HASIS value is set to a value other than DRIVER_MUST_STEER or DRIVER_HAS_HANDS_ON, resulting in a "no" at step S722, then step S726 is performed. At step S726, the steering timer is set to OFF, which can reset the steering timer according to an implementation. If it is determined at step S722 that the HASIS value is set to DRIVER_MUST_STEER or DRIVER_HAS_HANDS_ON, resulting in a "yes" at step S722, then step S724 is performed.

At step S724, the processing circuitry determines if the steering timer is set to OFF. If the steering timer is set to OFF, resulting in a "yes" at step S724, then step S728 is performed. Otherwise, if the steering timer is set to ON, resulting in a "no" at step S724, then step S732 is performed.

If the determination is made at step S724 that the steering timer is OFF, then at step S728, the steering timer is set to ON, which starts the timer that determines how long the steering warning has been active. At step S730, a new enforcement event can be added to the enforcement history. The enforcement history can include a log of the enforcement events that are sent to a driver along with the time at which the enforcement events occurred that can be stored in memory.

At step S732, if the steering timer is not set to OFF, it is determined if the steering timer is set to ON and if the steering timer has expired. If the steering timer is on and has expired, resulting in a "yes" at step S732, then step S734 is performed. At step S734, the steering timer is set to EXPIRED. Otherwise, if the steering timer is on and has not expired, resulting in a "no" at step S732, then the steering timer can continue to run.

Figure 8:
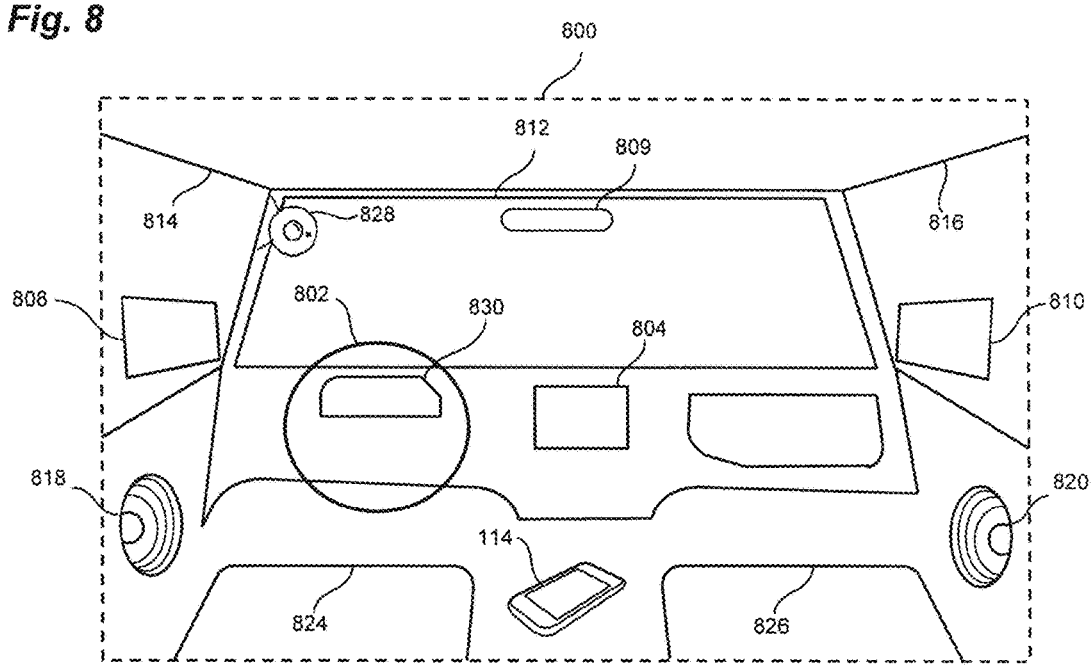
FIG. 8 is an exemplary illustration of an interior compartment of a motor vehicle.

FIG. 8 illustrates a schematic view of an implementation showing the locations of some components of a HMI system as seen from within interior compartment 800 of a motor vehicle. The interior compartment 800 of the motor vehicle includes a windshield 812, a left window 814, and a right window 816. A visual in-vehicle warning device can be a heads up display (not shown) that is incorporated with the windshield 812 in order to visually convey information to the driver when the driver's view is directed towards the road ahead.

The interior compartment 800 of the motor vehicle includes a left-side-view mirror 808, an instrument cluster 830, a navigation screen 804, a right-side-view mirror 810, and a rearview mirror 809. Additional visual in-vehicle warning devices can be incorporated in the left-side-view mirror 808, the instrument cluster 830, the navigation screen 804, the right-side-view mirror 810, and/or the rearview mirror. The visual in-vehicle warning devices can be lights, light emitting diodes (LEDs), liquid crystal display (LCD) screens, or LED screens.

The interior compartment 800 of the motor vehicle includes a steering wheel 802, a left seat 824, a right seat 826, a gas pedal, a brake pedal, a seat belt, and a heating ventilation and air conditioning (HVAC) system. A haptic-warning device can be incorporated in the steering wheel 802, the left seat 824, the gas pedal, the brake pedal, the seat belt, and/or the HVAC system. The haptic-warning device can warn the driver by creating a vibration or other mechanical actuation that is sensed by the driver. Also, the haptic-warning device can alert the driver's attention by other tactile means such as (e.g., blowing air at the driver using the HVAC system, or by tensioning the seat belt).

The interior compartment 800 of the motor vehicle includes a left speaker 818 and a right speaker 820. These speakers can be incorporated in the auditory warning device.

The interior compartment 800 of the motor vehicle includes a driver monitor camera 828. The driver monitoring camera can also be located on the steering column and can include multiple cameras located to either side of the steering wheel in a stereo camera implementation. Moreover, the driver monitor camera can be located to one side of the steering wheel as shown in FIG. 8. The driver monitoring camera can also include a camera on the portable device 114.

The portable device 114 can be located inside the motor vehicle 100. A camera on the portable device 114 can be used as the driver monitor camera 828. The portable device 114 can interface with the HMI system through network control circuitry. The portable device 114 can output warnings visually, audibly, and/or haptically.

In an implementation, the visual warning devices can include non-visual outputs, such as audio speakers to output sound. Also, the non-visual warning devices can include visual outputs. The portable device can include visual outputs (e.g., on an LCD screen), auditory outputs (e.g., audio speakers or a piezoelectric transducer), and haptic outputs (e.g., vibrations).

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 9:
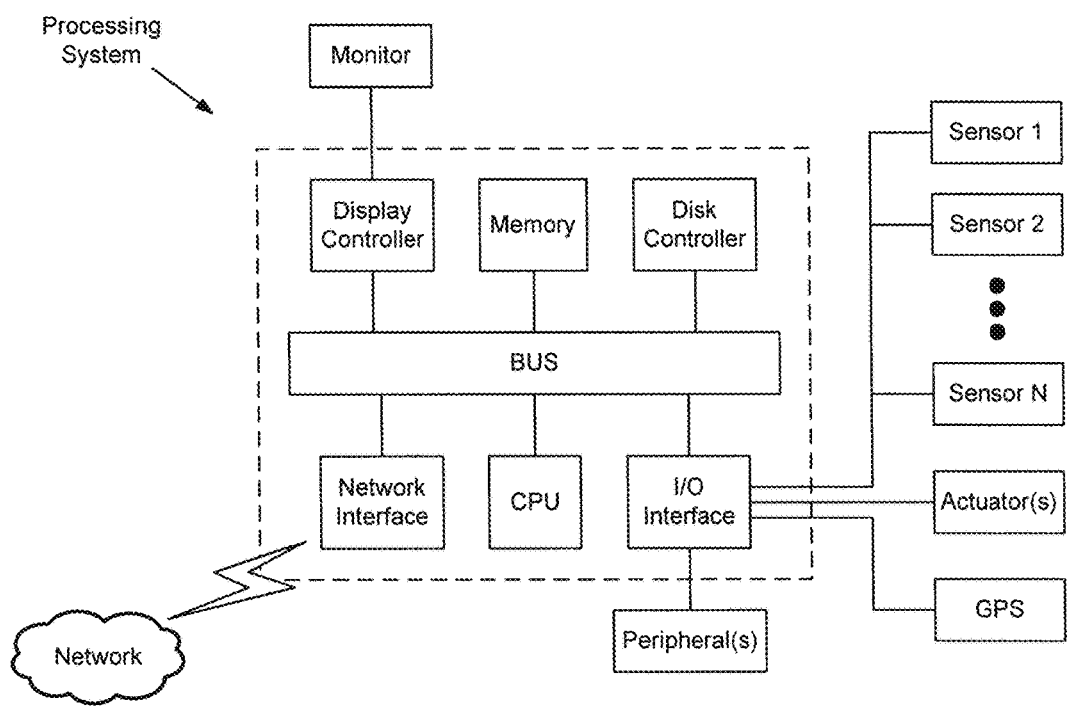
FIG. 9 schematically illustrates a processing system for a controller and/or a computer system.

FIG. 9 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors are one or more vehicle-mounted cameras, which may include CMOS, CCD, or other digital cameras that obtain images exterior to the vehicle, such as of the road in front of vehicle as well as a driver monitoring camera that obtains images of the driver. The sensors can also include lidar, radar, and/or sonar. Other sensors that input data to the I/O interface may include velocity sensors, acceleration sensors, steering sensors, gyroscope sensors, and the like. The I/O interface can also provide an interface for outputting control signals to one or more actuators to control various actuated components, including steering, brake, accelerator, and throttle controllers of a vehicle.

The I/O interface can also be connected to a mobile device, such as a smartphone, a portable storage device, and/or a global position system (GPS) device or another positioning device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. An apparatus, comprising circuitry configured to:
   determine an allowable driving state of a driver of a semi-autonomous driving system that is less restrictive than one or more other driving states of the driver based on one or more threats and performance of one or more sensors;
   classify one of the one or more threats as a comfort threat, which does not affect safety, or a safety threat based on a stored consequence level and a stored time-to-consequence associated with the one or more threats wherein the comfort threat is associated with a first type of consequence that corresponds to a reduction in driver comfort without a reduction in driver safety and a safety threat corresponds to a second type of consequence that corresponds to the reduction in driver safety;
   determine a current driving state of the driver and a future driving state of the driver based on a sensed attention state and a sensed steering state of the driver that is sensed using at least a capacitive steering wheel sensor mounted on a steering wheel of a vehicle that includes the semi-autonomous driving system to determine whether the driver is touching the steering wheel;
   provide warnings to the driver via a human machine interface (HMI) associated with the semi-autonomous driving system to match the current driving state of the driver to the future driving state of the driver; and
   enforce driving interaction or attention by modifying an engagement status of the semi-autonomous driving system to cause a physical change in the driving state of the vehicle when the driver is not responding to the warnings.

2. The apparatus of claim 1, wherein the circuitry is further configured to:
   determine that the one or more threats is driver-sensed or system-sensed;
   determine a desired action by the driver for the one or more threats; and
   determine a priority for the one or more threats based on an associated time of occurrence.

3. The apparatus of claim 2, wherein the circuitry is further configured to determine the desired action by the driver for a threat based on a driver attention time in response to determining that the threat is a driver-sensed threat.

4. The apparatus of claim 2, wherein the circuitry is further configured to determine the desired action by the driver for a threat based on an eyes on road time in response to determining that the threat is a system-sensed threat.

5. The apparatus of claim 1, wherein the circuitry is further configured to compare the time-to-consequence for the one or more threats to the driver response time to determine the allowable driving state of the driver.

6. The apparatus of claim 1, wherein the circuitry is further configured to determine that the driver has complied with one or more previous requests.

7. The apparatus of claim 6, wherein the circuitry is further configured to determine that the future driving state of the driver will not generate one or more warnings within a predetermined time period.

8. The apparatus of claim 7, wherein the future driving state of the driver is set to the allowable driving state of the driver that is less restrictive than the one or more other driving states of the driver.

9. The apparatus of claim 1, wherein the warnings include attention warnings and steering warnings.

10. The apparatus of claim 9, wherein the warnings are provided when the future driving state of the driver is more restrictive than at least one of the current driving state of the driver and a current lane trace control state.

11. The apparatus of claim 10, wherein the circuitry is further configured to determine the current lane trace control state based on a level of automation of a lane trace control system.

12. The apparatus of claim 1, wherein the circuitry is further configured to determine an amount of time the driver takes to comply with the warnings.

13. The apparatus of claim 12, wherein the circuitry is further configured to enforce the driving interaction when the amount of time the driver takes to comply with the warnings is greater than a first predetermined threshold.

14. The apparatus of claim 13, wherein the circuitry is further configured to enforce the driving interaction by implementing one or more enforcement interventions.

15. The apparatus of claim 1, wherein the circuitry is further configured to compare a number of enforcement events in an enforcement history to a second predetermined threshold.

16. The apparatus of claim 15, wherein the circuitry is further configured to determine a safe scenario for disengaging the semi-autonomous driving system; and
   disengage the semi-autonomous driving system when the number of the enforcement events in the enforcement history is greater than the second predetermined threshold.

17. The apparatus of claim 1, wherein the circuitry is further configured to:
assign the one or more threats classified as the comfort threat to a comfort threat list;
assign the one or more threats classified as the safety threat to a safety threat list; and
process the safety threat list before the comfort threat list.

18. A method, comprising:
determining an allowable driving state of a driver of a semi-autonomous driving system that is less restrictive than one or more other driving states of the driver based on one or more threats and performance of one or more sensors;
classifying one of the one or more threats as a comfort threat, which does not affect safety, or a safety threat based on a stored consequence level and a stored time-to-consequence associated with the one or more threats wherein the comfort threat is associated with a first type of consequence that corresponds to a reduction in driver comfort without a reduction in driver safety and a safety threat corresponds to a second type of consequence that corresponds to the reduction in driver safety;
determining a current driving state of the driver and a future driving state of the driver based on a sensed attention state and a sensed steering state of the driver that is sensed using at least a capacitive steering wheel sensor mounted on a steering wheel of a vehicle that includes the semi-autonomous driving system to determine whether the driver is touching the steering wheel;
providing warnings to the driver via a human machine interface (HMI) associated with the semi-autonomous driving system to match the current driving state of the driver to the future driving state of the driver; and
enforcing driving interaction or attention by modifying an engagement status of the semi-autonomous driving system to cause a physical change in the driving state of the vehicle when the driver is not responding to the warnings.

19. A non-transitory computer-readable storage medium including executable instructions, which when executed by circuitry, causes the circuitry to perform the method according to claim 18.

20. A system, comprising:
one or more sensors to obtain threat data and driver monitoring data; and
a controller including a processor configured to:
determine an allowable driving state of a driver of a semi-autonomous driving system that is less restrictive than one or more other driving states of the driver based on one or more threats and performance of one or more sensors;
classify one of the one or more threats as a comfort threat, which does not affect safety, or a safety threat based on a stored consequence level and a stored time-to-consequence associated with the one or more threats wherein the comfort threat is associated with a first type of consequence that corresponds to a reduction in driver comfort without a reduction in driver safety and a safety threat corresponds to a second type of consequence that corresponds to the reduction in driver safety;
determine a current driving state of the driver and a future driving state of the driver based on a sensed attention state and a sensed steering state of the driver that is sensed using at least a capacitive steering wheel sensor mounted on a steering wheel of a vehicle that includes the semi-autonomous driving system to determine whether the driver is touching the steering wheel;
provide warnings to the driver via a human machine interface (HMI) associated with the semi-autonomous driving system to match the current driving state of the driver to the future driving state of the driver; and
enforce driving interaction or attention by modifying an engagement status of the semi-autonomous driving system to cause a physical change in the driving state of the vehicle when the driver is not responding to the warnings.

* * * * *